(12) United States Patent
Fomenko et al.

(10) Patent No.: US 8,639,630 B2
(45) Date of Patent: Jan. 28, 2014

(54) DISTRIBUTION OF DIGITAL CONTENT

(75) Inventors: Oleg Fomenko, London (GB); Patrick Foreman, London (GB); Andrew Kerdemelidis, London (GB); Thong Nguyen, London (GB)

(73) Assignee: DDN IP Holdings Limited, Nicosia (CY)

( * ) Notice: Subject to any disclaimer, the term of this patent is extended or adjusted under 35 U.S.C. 154(b) by 209 days.

(21) Appl. No.: 12/867,741

(22) PCT Filed: Feb. 12, 2009

(86) PCT No.: PCT/GB2009/050140
§ 371 (c)(1),
(2), (4) Date: Dec. 3, 2010

(87) PCT Pub. No.: WO2009/101443
PCT Pub. Date: Aug. 20, 2009

(65) Prior Publication Data
US 2011/0071841 A1    Mar. 24, 2011

Related U.S. Application Data

(60) Provisional application No. 61/029,320, filed on Feb. 16, 2008.

(30) Foreign Application Priority Data

Feb. 15, 2008 (GB) .................................. 0802739
Sep. 23, 2008 (GB) .................................. 0817346

(51) Int. Cl.
*G06Q 99/00* (2006.01)

(52) U.S. Cl.
USPC ................... 705/71; 705/77; 705/78; 705/79; 707/622

(58) Field of Classification Search
USPC ................................ 705/51, 77–79; 707/622
See application file for complete search history.

(56) References Cited

U.S. PATENT DOCUMENTS

| 7,370,017 | B1 | 5/2008 | Lindeman |
| 7,451,217 | B2 * | 11/2008 | Wardrop ........................ 709/225 |
| 7,574,515 | B2 * | 8/2009 | Fontijn et al. ................. 709/232 |
| 8,122,488 | B2 * | 2/2012 | Hoch et al. ........................ 726/4 |
| 2001/0037311 | A1 * | 11/2001 | McCoy et al. .................. 705/65 |
| 2003/0061287 | A1 | 3/2003 | Yu et al. |

(Continued)

FOREIGN PATENT DOCUMENTS

EP          1 348 151 A     10/2003
WO      WO 01/24474 A     4/2001

(Continued)

OTHER PUBLICATIONS

PCT Written Opinion, PCT Application No. PCT/GB2009/050140, Aug. 15, 2010, twelve pages.

(Continued)

*Primary Examiner* — James D Nigh
(74) *Attorney, Agent, or Firm* — Fenwick & West LLP

(57) ABSTRACT

Methods and systems for providing items of content over a peer-to-peer system are described. Items of content are requested from a central server by a downloading peer, and the central server determines uploading peers from whom the downloading peer may request parts of the content item.

8 Claims, 15 Drawing Sheets

(56) References Cited

U.S. PATENT DOCUMENTS

| | | |
|---|---|---|
| 2003/0154274 A1 | 8/2003 | Nakamura |
| 2004/0122958 A1* | 6/2004 | Wardrop ................ 709/229 |
| 2007/0005797 A1* | 1/2007 | Fontijn et al. ............. 709/238 |
| 2008/0071668 A1 | 3/2008 | Blau |
| 2008/0133767 A1* | 6/2008 | Birrer et al. ............... 709/231 |
| 2008/0289006 A1* | 11/2008 | Hock et al. .................. 726/4 |
| 2009/0313353 A1* | 12/2009 | Lou ........................ 709/219 |
| 2010/0088520 A1* | 4/2010 | Charles et al. ............. 713/178 |
| 2010/0241708 A1* | 9/2010 | Zuckerman et al. ......... 709/204 |

FOREIGN PATENT DOCUMENTS

| | | | |
|---|---|---|---|
| WO | WO 2005/038617 | 4/2005 | |
| WO | WO 2007/148300 A | 12/2007 | |
| WO | WO2008/016442 A2 * | 2/2008 | ............ G06F 21/20 |
| WO | WO 2008/064356 A | 5/2008 | |

OTHER PUBLICATIONS

U.S. Appl. No. 10/553,549, filed Oct. 19, 2005.
PCT International Search Report and Written Opinion, PCT/GB2009/050140, Sep. 10, 2009, 5 Pages.

* cited by examiner

DISTRIBUTION OF DIGITAL CONTENT

FIELD OF THE INVENTION

The invention relates to the regulated distribution of digital content. In aspects, the invention relates to distribution of digital content over a peer-to-peer (P2P) network. In particular aspects, the invention relates to distribution of digital content over a P2P network supported by a central server. In further aspects, the invention provides specific technologies to facilitate such distribution.

BACKGROUND TO THE INVENTION

P2P networks are widely used for the distribution of digital content over the public internet. Contemporary P2P networks are generally unregulated. Unregulated P2P networks such as BitTorrent and eDonkey operate as decentralised overlay networks running over TCP/IP protocol. In such networks there is no definitive central server.

Discovery of remote peers is performed using such overlay networks. Decentralised P2P networks normally use distributed hash tables (DHTs) to implement the mechanism to discover which peers hold a particular file. One difficulty with this approach is that using DHTs it is only possible to perform exact-match searches rather than keyword searches however, while keyword search functionality is not supported directly by DHTs, it can generally be layered over them. BitTorrent uses trackers to facilitate the discovery of peers—a BitTorrent tracker is server software which assists in the communication between peers using the BitTorrent protocol.

Unregulated P2P networks for sharing digital content have been popular with users, but very unpopular with content providers. Without a central server acting as an authority, unregulated networks are unable to perform a number of functions that a content provider would desire. For example, there is no control over authenticity of content downloaded, or who downloads from whom, no way to make newly available peers immediately available to existing peers and no way to provide effective balancing of peer-to-peer network traffic load Some of the concerns of content providers can be met by regulating the P2P network, and this can allow for payments to be made to content providers. A regulated peer-to-peer network, such as Napster, involves a central authority to verify that a purchase has been made. A user obtaining content through the network participates in it as a downloading peer. If a downloading peer requests a file that the associated user has found (this may have been indexed in a central index associated with the central authority, or through DHTs), it must then make a payment to the central authority. If the payment is successful, the central authority, when queried by an uploader, can confirm that a downloading peer is authorised to download a particular file. The central authority will provide a list of Internet Protocol (IP) addresses of various uploading peers which currently are online and which store the file, and who will upload that file to the downloading peer. The downloading peer subsequently contacts the uploading peers and requests the file. The uploading peers check with the central authority to verify that payment has been made, then the downloading peer downloads part of, or the entire file from each uploading peer.

One problem associated with such regulated P2P networks is that they are unattractive to users. Users will not subscribe to such regulated networks, in which content is purchased, because such content is widely available without charge on unregulated networks.

One proposed solution to this problem is to provide an incentive for users to join a regulated network in which legal file sharing can be enforced. This is achieved by rewarding those who participate in file sharing. One such arrangement is shown in EP 1348151 A2, in which a payment is made to a central authority for downloading a file, but in which a payment is also made to an uploading peer for uploading the file for download by the downloading peer.

The availability of a reward structure of this kind provides a disincentive for an uploading peer to make their library of content available over an unregulated P2P network, as it will not be rewarded for providing its legitimately owned content over such a network.

However, there are many technical hindrances to implementation of P2P networks, especially those which are regulated and set up to reward user participation.

For example, in a regulated P2P network, users need to pay for the content that is downloaded. Therefore there are significant security and accountancy considerations related to authenticating the purchase of content.

Furthermore, it is necessary to be able to efficiently propagate content from peer to peer on the network for the purposes of making that content widely available in a short amount of time. This is particularly challenging in view of the constraints of a peer-to-peer network that is regulated. Building in functionality associated with regulation tends to work against maximising content propagation.

A system is required that is capable of alleviating the above-mentioned problems.

SUMMARY OF THE INVENTION

In a first aspect, the invention provides a method of providing digital content over a peer-to-peer network, comprising: a first peer requesting an item of digital content from a central authority; the central authority identifying a plurality of second peers from whom the item can be downloaded; the central authority preparing at least one token each identifying at least one of the plurality of second peers and the first peer, and sending the at least one token to the first peer; the first peer sending one or each of the at least one tokens to a second peer identified in that token, each sent token identifying the first peer, the second peer to whom the token is sent, and the item requested by the first peer, with a request for a part of the item from said second peer; wherein each second peer receiving said token transmits the requested part of the item to the first peer.

Advantageously, this aspect of the invention can be used to provide a highly efficient regulated P2P system in which a central authority authorises downloading of content, but without the need for constant communication between the central authority and the peers. Preferably, the tokens are transferred in an encrypted form. For example, the tokens provided by the central authority may be signed using a private key of the central authority, and decrypted using a public key provided to the peers. A certificate authority may be used to provide independent verification of the public key. Use of a public key infrastructure serves to provide security without excessive communication between parties.

This approach is extremely effective in providing an uploading peer with verification that a downloading peer has been authenticated to download a specific file after the downloading peer has purchased content associated with that specific file. This is not normally a consideration for P2P networks which generally are unregulated, as in such networks no authoritative authentication is carried out.

This solution provides advantages over an approach in which each uploading peer needs to query a downloading peer's authentication status from a central server. In such an implementation, the volume of data transferred between peers and authentication servers would be much greater, and a delay would be introduced between placing of a purchase and the start of downloading of content the sharing peer. A further overhead would be needed in that the authentication server would need to store information on, and process queries for, each peer validation request. This would place a burden on application and database servers.

The approach indicated in this aspect of the invention is particularly effective when multiple sources (uploading peers) are simultaneously accessed by a downloading peer for a particular file, as is usually the case in a peer-to-peer network.

Advantageously, a token is provided for each potential uploading peer identified by the central authority. The downloading peer may then provide the appropriate token to each downloading peer from whom a part of the data item is requested.

This authorisation mechanism combines effectively with the receipt of payment from the downloading peer, and with accounting to provide remuneration to the content owner and/or remuneration, rewards or other incentives for uploading peers (as discussed in other aspects of the invention).

In another aspect, the invention provides a method of providing digital content over a peer-to-peer network, comprising: a first peer requesting an item of digital content from a central authority; the central authority identifying a plurality of second peers from whom the item can be downloaded and advising the first peer; the first peer requesting a part of the item from one of the plurality of second peers; the second peer which received the request sending the requested part of the item to the first peer; the first peer providing a receipt to said second peer, the receipt identifying at least the first peer, said second peer, and the part of the data item; and said second peer providing the receipt to the central authority.

Advantageously, receipts can be grouped as part of a transaction log and uploaded in one go by the uploading peer to a regulating server acting for the central authority. The receipts may contain performance indicators which can be used by the central authority in allocation of subsequent uploading activity. The receipts may also be used to determine appropriate financial recompense or other rewards/incentives for an uploading peer for participating in uploading activity.

In a preferred approach, uploading peers do not need to transfer entire files to obtain rewards—thereby retaining advantage of multiple sources on the P2P network. By having the downloading peer pass receipts to the uploading peer when the uploading peer has uploaded a 'chunk' (part of a file) to the downloading peer, the uploading peer knows they will be rewarded, and can move on to upload another chunk of a file.

This approach can provide effective communication of information between the peers and a regulating server acting for the central authority, but can do so without excessive communication on the network (chatter) which would affect content transfer activity. Individual receipts may be passed only from downloading to uploading peer. As indicated above, it is preferred that before receipts are transmitted on to a regulating server, they are grouped. Reconciliation of receipts can be controlled by the regulating server acting for the central authority, and the timing of this is not critical—the download can be actioned in times of low network utilisation.

In a further aspect, the invention provides a method of determining the partitioning and sending of a data file, comprising the following steps executed by a programmed processor: identifying a plurality of parts into which the data file is to be partitioned; determining an ordering of the plurality of parts dependent upon a number representing a client identity; determining a part of the data file to be sent or requested on the basis of the determined ordering; and sending or requesting a part of the data file in accordance with the determined ordering.

Preferably, the client identity is an identity of a client to receive the data file. This enables different downloading peers to obtain file parts in different orders.

Downloading parts of a file simultaneously from multiple sources distributes bandwidth usage. Furthermore, downloading in an order that is not uniform for all peers maximises content availability and minimises the amount of content seeding that uploading peers need to perform. The parts of a file made available for download will be termed "chunks" hereafter.

In addition to these advantages, being able to calculate the non-uniform download order means that it is not necessary for additional data relating to download order to be stored, nor is it necessary for any query to be transmitted between a downloading peer and a source (uploading peer) to determine chunk download order. This reduces the amount of overhead information that needs to be transmitted over the peer-to-peer network thus improving performance and reducing cost. This is particularly advantageous for a regulated P2P network, as the regulating server can easily acquire information relating to which peers are likely to have what chunks as part of the purchase negotiation process.

Use of a predetermined algorithm to determine download order which provides different results for different uploading peers allows both for effective chunk provision through upload but also for an effective download strategy as chunk availability can be predicted by the downloading peer (or by the central authority on the downloading peer's behalf).

In a still further aspect, the invention provides a method of providing digital content over a peer-to-peer network, comprising: a first peer requesting an item of digital content from a central authority; the central authority identifying a plurality of second peers from whom the item can be downloaded and advising the first peer, wherein the item is adapted to be provided as a sequence of playable parts; the first peer determining a request pattern such that if the first peer starts to play the digital content after receipt of the first playable part in the sequence, subsequent playable parts of the sequence will be predicted to be received to allow them to be played in sequence substantially without interruption to the playing of the digital content; the first peer requesting the sequence of playable parts from, in combination, a plurality of the second peers in accordance with the request pattern.

These playable parts, or "super chunks", of content may be requested in a simple sequence of consecutive parts or simply sufficiently early for the content to be played continuously to appear to the user as if it were conventional streamed media. This allows content to be played faster by the downloading user, as it is not necessary for the whole content file to be downloaded before use. Within each super chunk, content may be requested from a plurality of uploading peers, and may be provided in a different download order from different uploading peers in the manner indicated in the preceding aspects of the invention. This approach combines early availability of the content for playing at the downloading peer with high chunk availability and effective propagation of chunks.

It is to be noted that this aspect of the present invention is distinguished from traditional streaming methods because the chunk download order is non-chronological. Whilst playable parts are transferred in substantially the correct order, smaller chunks making up those parts are not. This means a larger availability of chunks on a content distribution network as a whole, thereby leading to overall improvement in performance. This is contrary to traditional streaming methods where a media file is streamed in substantially sequential order from start to finish.

In aspects, the invention is particularly applicable to media content, for example audio or video files. Certain aspects of the invention are particularly relevant to content that may be streamed. Other aspects are relevant to other digital content, such as software or game applications. Nonetheless, all aspects of the invention have particular relevance to digital media content.

It will also be understood that features of different aspects of the present invention can be combined with one another where context allows.

SPECIFIC EMBODIMENTS OF THE INVENTION

Specific embodiments of the invention will now be described, by way of example, by reference to the accompanying Figures, of which:

Embodiments of a peer-to-peer content distribution system with central management and control will now be described. The basic elements of the system and of its main modes of operation will be described with reference to FIGS. 1 to 3. Specific aspects of the system and of its operation will be described thereafter in more detail.

Figure 1:
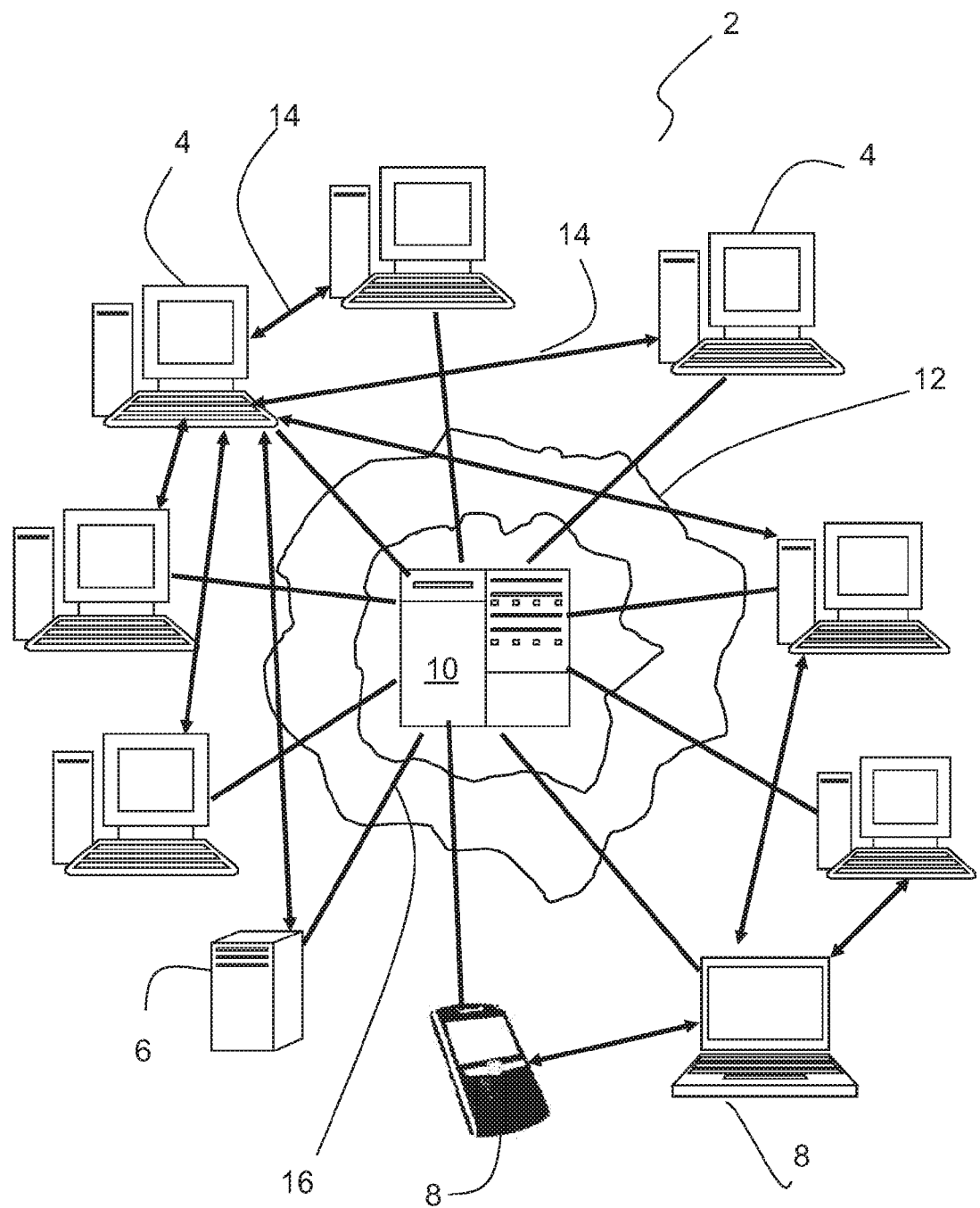
FIG. 1 shows elements of a system suitable for implementing embodiments of the invention.

FIG. 1 shows the main device elements of the content distribution system 2. Content is uploaded by and downloaded to client devices 4, 6, 8. These may be any kind of computing device adapted to provide content to a user either directly or indirectly. The computing devices shown here are personal computers 4, servers 6, and mobile devices 8 such as laptop or tablet computers or mobile telephones. The system also contains a central authority (although this is for convenience described hereafter as being implemented by a single server 10, it will be appreciated that the functions of the central authority may be implemented by a plurality of interacting physical servers or by a virtual server implemented on suitable hardware) which controls communication of content through the content distribution system 2 by authenticating participants and legitimacy of content for onward provision and by authorising transactions over the system. The central server 10 and the client devices 4, 6, 8 are interconnected by network communication links, which in some cases will generally pass through the public internet 12. The clients interact in a peer-to-peer network and can be considered to be joined to each other by peer-to-peer connections 14, whereas each client can be considered to interact with the central authorisation server by a direct communication link 16.

Figure 2:
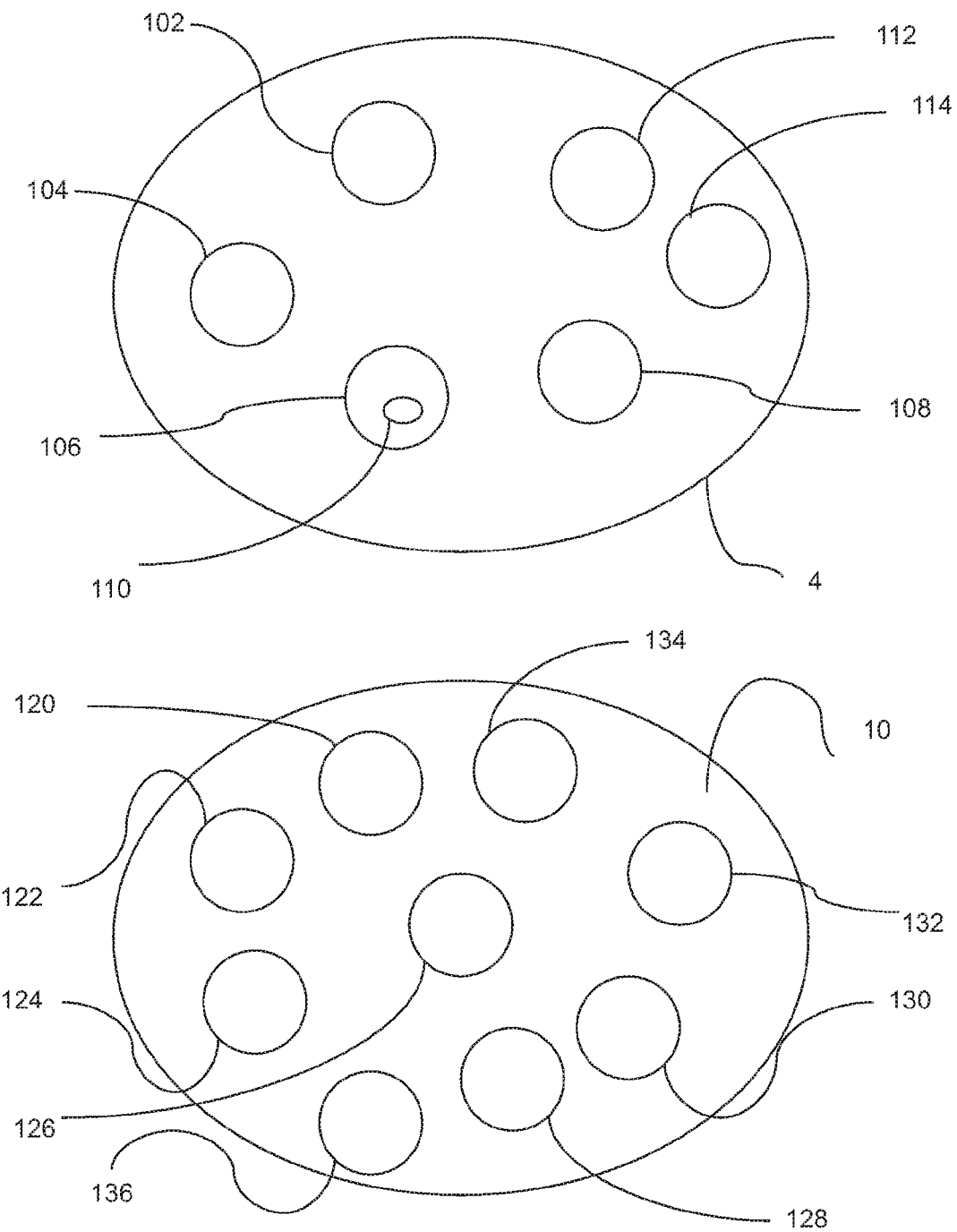
FIG. 2 shows computing elements of a central authority and a peer suitable for implementing embodiments of the invention.

FIG. 2 shows the computing elements associated with each of an exemplary client 4 and the central server 10 used to carry out the role of each in the content distribution system 2.

A client 4 has the following functions, each implemented with the assistance of one or more software routines. The client 4 has a peer-to-peer content distribution function 102. This is adapted to respond to instructions to provide some or all of a content item for uploading by dividing up content into chunks and by transmitting it by an appropriate protocol, and is adapted to respond to incoming content by indicating that it has been safely received and by assembling the received chunks to form a content item. This distribution function may be split into separate sending and receiving functions— mechanisms are also provided to request a retransmission or an alternative transmission if a chunk cannot be or is not successfully provided. Associated with the content distribution function 102 is a logging function 104 which logs downloaded content received by the client 4, and which also logs acknowledgements of safe receipt of content by a downloading client. Messages between clients are sent through the peer-to-peer messaging function 106 using TCP/IP or UDP protocols, either directly or via proxy servers which provides authorised requests for content from downloader to uploader, and which provides acknowledgements from downloader to uploader when chunks of content are safely received.

Interaction with the central server is handled through the central interaction function 108. Through this function, the user registers with the system (and is subsequently authenticated), searches for content items available on the system and requests a content item for purchase. An approved request is received by the client from the central server through this function so that it can be forwarded to uploading clients— uploading clients can obtain confirmation through this function that a received approved request is valid. The central interaction function is provided with a public key 110 of the central server to allow it to determine whether messages purporting to originate from the central authorisation server are genuine. The public key 110 may alternatively be held by a cryptographic processing function 114 of the client that is also adapted to sign data with a private key of the user/client. The private key of the client may be used to sign messages that it is desirable to confirm originate from the client (for example, it is desirable that receipts for content chunks can be confirmed to originate from a downloading peer). This private key should be stored securely at the client. It is not essential for public keys (of the client, the central authority or any other party) to be held with the same level of security as the client private key, but it is desirable for the client to be able to ensure that such public keys are genuine (they may be lodged with a certification authority for this purpose).

The audit function 112 is associated with both the central interaction function 106 and the logging function 104. The audit function 112 reports through the central interaction function 106 periodically on content uploaded and downloaded as logged by logging function 104. The audit function receives indications of rewards associated with these uploads and downloads.

The central server 10 has complementary functions to those provided in the central interaction function of the client 4, but also has management and control functions which have no direct counterparts in the client. The central server has a registration and authorisation function 120 by which new clients can register with the system and through which clients can be authenticated as required in the process of content distribution. The server has a secure messaging system 122 including means for receiving or generating key pairs so that it can retain a private key and distribute a public key so that messages from the secure messaging system 122 can be identified as genuine. The server also has a central server version of the peer-to-peer content distribution function, identified here as 124, to assist the central authorisation server in distributing the uploading of a content item between uploading clients. As will be discussed below, this may be used by the central authorisation server to provide a suggested downloading strategy to a downloading peer.

The request management function 126 of the central authorisation server receives requests for a content item from a client. It determines whether and how the content item request is to be met, identifying which clients are to be involved in the uploading of content and identifying which of the content item each client is to upload, and provides the results to a client as an authorised request in the form of a token signed using the secure messaging system 122. This token contains an identifier for an intended uploader, and the intended uploader's IP address. Within this signed token, further arbitrary restrictions can be set, such as the chunk references that the downloader is permitted to access, the downloaders specific IP address for the uploader to upload chunks to, and a maximum bandwidth that the uploader should use. It can also contain ancillary information, such as network usage and peer performance statistics.

Performance management and audit system 128 interacts closely with the request management system 126, providing input which assists in the determination of which uploading clients are to be used and how. The performance management system receives from the clients indications of successful communication of chunks of content items—and indications of failed transmissions. Failed transmissions are signalled to the performance management system using the same mechanism that is used to transfer transaction logs. Information about failed transmissions may be used by the performance management system when allocating potential upload peers in the future. When the transmission of a chunk fails (because of timeout, missing chunks or any other cause) then the client, without need to immediately notify the server, may try to download the same chunk from another peer. If no other peers are able to supply the chunk, then the client may request new tokens from the server (with a new listing of potential uploading peers). The request to the server for new peers will include a list of the current peers and an indication of which peers have failed. Successful receipt of chunks is used to determine rewards to clients. The receipt may include performance characteristics added and signed by the downloader (as measured by the downloader). This central authority stores the definitive index of the items legitimately downloaded from the system by clients and updates the client and content database 132 (see below) accordingly. A new location for legitimately obtaining content is added when a purchase is made through the client or website and download is started by the downloader.

Accounting system 130 takes inputs from the audit system 128 and also from data identifying successful uploads and downloads received from the clients, reconciling the two. This data is used to determine the rewards to be received by each client, and may also be used by the request management function 126 to determine which clients should be used for uploading in order, for example, to ensure that the network is used efficiently, or, for the purpose of fairness, in that all clients connected to the network have the opportunity to participate in a download and receive rewards for doing so or to determine which clients should be used for uploading and therefore earn incentives according to any centrally chosen criteria. This system also determines what payment should be made to the original content provider for the use made of the content that they have directly or indirectly made available. The accounting system 130 also holds the user account with the system, and is adapted to receive payment from a user for requested content.

Client and content database 132 identifies not only what clients are associated with the content delivery system, but also which content items they possess and are currently able to upload and in which formats. This database may be linked with, or incorporate information needed for, the registration and authorisation function 120 and the reconciliation system 130.

Content display site 134 indicates to a user the content available as identified in the client and content database 132. A user may interact with this site to search for, identify and place an order for a content item, with calls as appropriate to the registration and authorisation function 120 and the request management function 126 to determine whether the user is able to request content and to determine how the content item is to be provided accordingly.

It is necessary—as has been shown above—for each peer to be able to run a client application. Client application download function 136 provides functionality to ensure that a new client downloads the client application on registration, and also may interact with the client applications when running to ensure that a functional version of the client application is being used at each active peer (either prompting to download updates or providing them through an automated update tool if necessary).

Figure 3A:
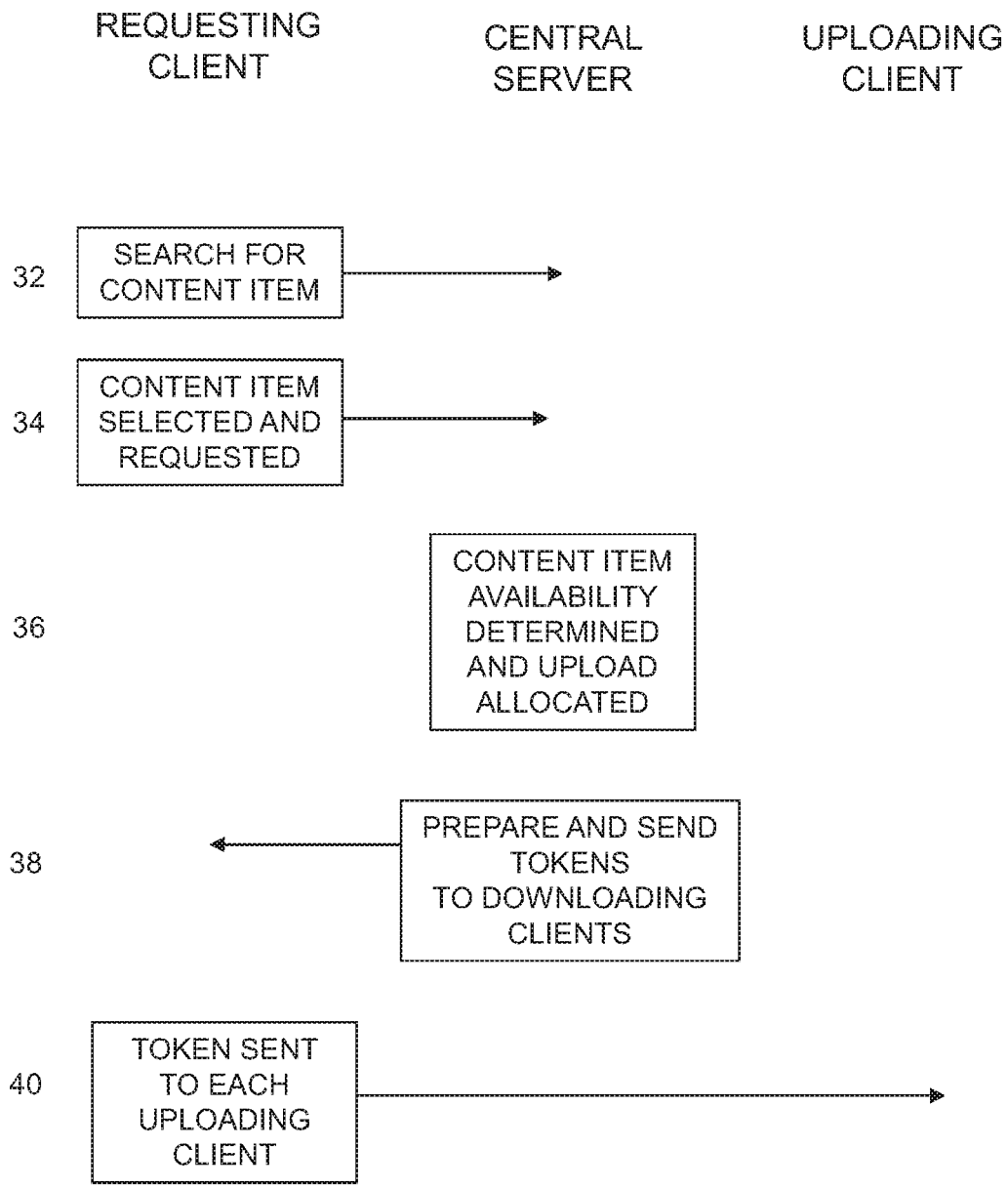
FIG. 3A and FIG. 3B shows schematically steps for providing an item of digital content in accordance with an embodiment of the invention.
Figure 3B:
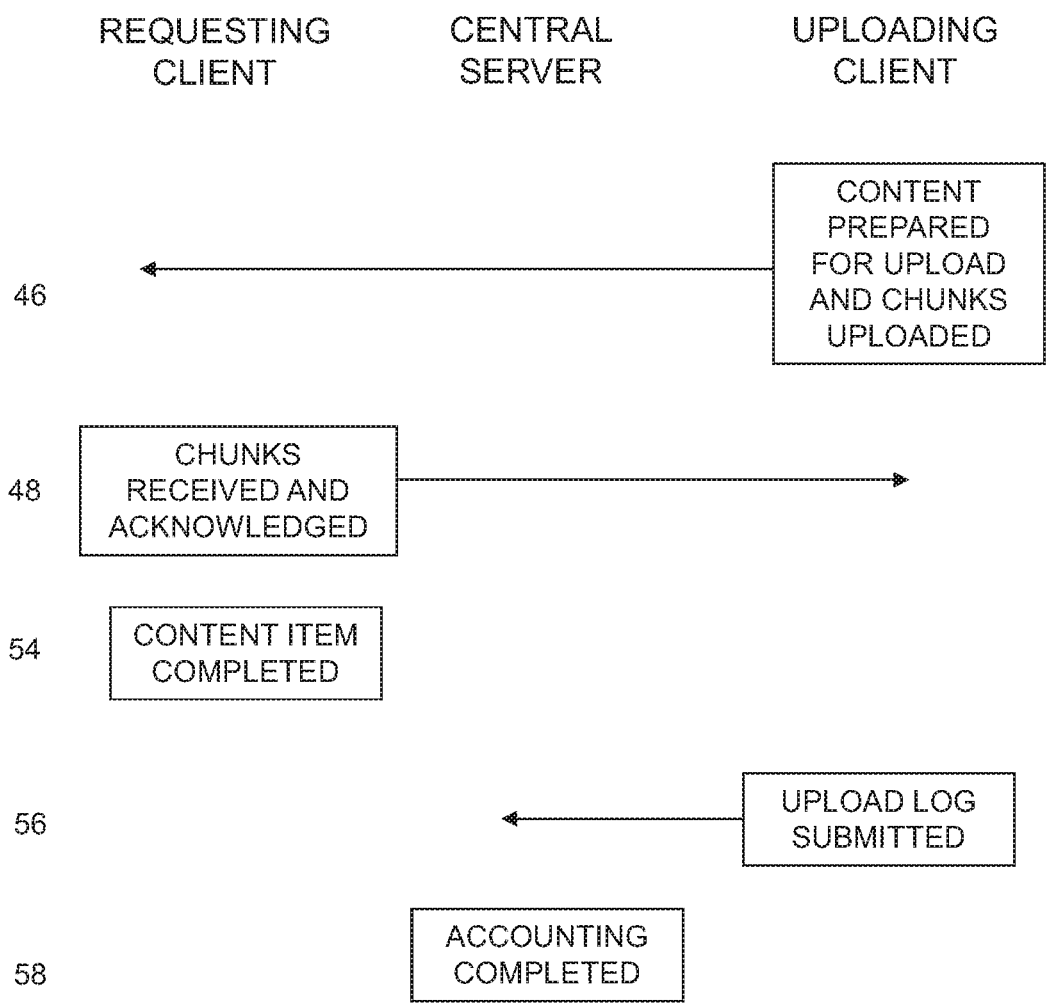
Figure 4:
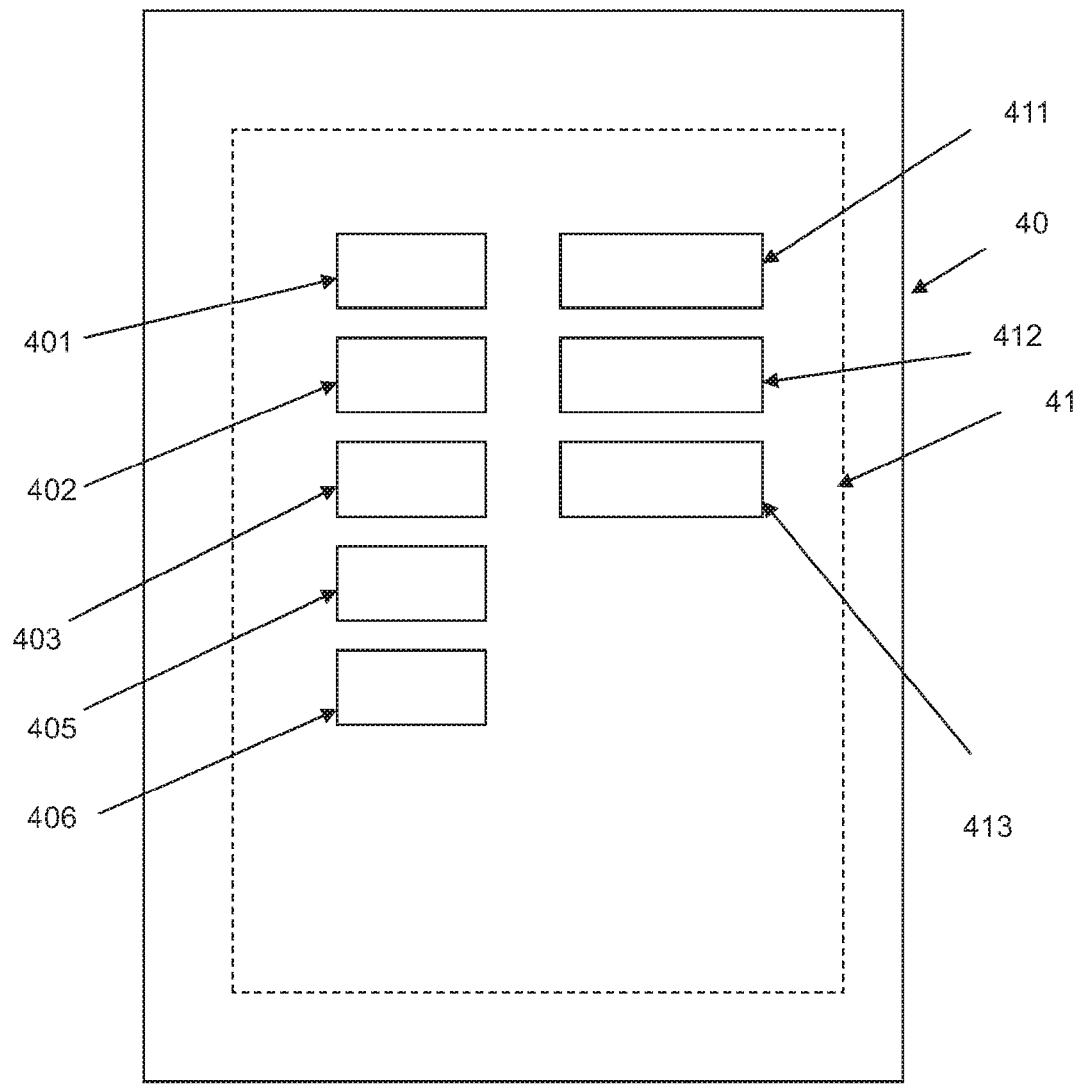
FIG. 4 shows the structure of a token adapted for use with embodiments of the invention.

FIG. 3A and FIG. 3B indicate the main elements of a method of content delivery using the content delivery system described above.

Steps 32 to 54 relate to the process of distribution of content available through the content delivery system. In step 32 a user, typically acting through their registered client, searches for content on the content display site 134 (though authentication of the client need not take place until a content item is actually requested). In step 34, a content item is selected through the content display site and a request to purchase the content item made to the central server 10. This step may involve allocating a payment from a user account or by some other mechanism taking a payment from the user. The central server may at this time also determine an approach to apportioning this payment (for example, it may determine a sum that should be provided to the original content provider, a sum that would be retained by the service provider administering the central server, and a sum that may be distributed between uploading peers participating in the distribution of the content item to the downloading peer).

If the central server 10 determines (step 36) that the content item can be provided to the requesting client, it then determines from the client and content database 132 and from the performance management and audit system 128 which clients should participate in uploading the content item and what role each client should take. As a default position, each client in possession of a part of a requested data file and with the rights to upload it for download by another client could be included to participate. If this would result in involvement of an unnecessarily large number of uploading clients, then clients could be selected for features such as existing relationships to the downloader, proximity, or high effective bandwidth. Preferred approaches are provided further below.

The central server provides this information in a token, signed with its private key, which is sent to the requesting client (step 38)—this may be accompanied by a list or other immediately accessible file summarising the options provided by the central server to allow processing by the requesting client without opening each token. The requesting client then provides (step 40) this token to each of the uploading clients designated as being involved in the delivery of the content item.

On receiving a token, each designated uploading client may check the token to ensure that it has been provided by the central authorisation server to ensure that the request is authorised. Any of the peers receiving the token may check that it has been properly issued by using the public key of the central authority to check the digital signature of the message, and if a certification authority is used, may also use that to check that the certification authority confirms that the public key does indeed represent the central authorisation server. Each uploading client provides (step 46) the designated parts of the content item—to do this, it may be necessary for the content item to be divided into chunks according to a process common to each of the uploading clients. When each chunk is received (step 48) by the requesting client, an acknowledgement is provided to the relevant uploading client to confirm that this has been safely received—which also serves as an indication to the uploading client that it will be entitled to receive a payment. Uploading and downloading clients both maintain logs of content sent and received.

When a chunk is not properly received or when an uploader notifies a downloader that the chunk is not available, the downloader will try to download the same chunk off another peer. If no other peers have the chunk, the downloader may contact the central authority to get additional peers. The downloader could also ask the uploader for a list of chunks that are actually available.

When all chunks are received, the content item file is then rendered usable and available to be utilised—for example, if the content item is a media file, it can be played. This completes the process of downloading a content item, though it does not complete the process of transaction accounting. Periodically, an uploading client sends (step 56) its log of its successful data packet uploads to the central server (this may include, for example, details of the date, data content, size of upload, user ID of the recipient downloading client and so on). The upload log is essentially a list of amended receipts from downloading clients.

On receipt of this upload log, the central server performs (step 58) further steps to reconcile its accounts with the relevant client for its uploading activity. The central server validates the sender's details and checks the received transaction log to reconcile it with purchases made and records received from downloading clients. It is the responsibility of uploading clients to claim their credits for uploads by providing receipts received from downloaders—however, in preferred arrangements these will still be compared by the central server against receipts received directly from downloaders. In yet further preferred arrangement, the central server may actively pursue selected uploaders and/or downloaders for transaction logs/receipts. The central server or the peers may be set up to transmit or request such information during periods of low network traffic.

The credit record for the uploading member is then updated, based on the proportion or size of the file uploaded and the credit value associated with that content item at the time of the upload.

This arrangement offers a series of benefits to each of the participants, these benefits in many cases flowing from synergies between different features of the system. Provision of content items is provided rapidly and efficiently over a peer-to-peer system with central control that ensures fair returns both for the content provider and for clients that participate in the uploading process. Communication between participants is managed so as not to cause excessive network traffic but so as to ensure that urgent messaging is handled at appropriate speed but non-urgent messaging is deferred until it places less burden on the system and its associated infrastructure. The system nonetheless allows for rapid and effective accounting for the service provider and for clients.

Specific aspects of the system and of its operation will now be described in further detail.

User Registration

Before being allowed to download content from the content delivery system, a user needs to register with it. This is necessary to provide the central authority, and all who rely on the central authority, that the user can be relied on not to redistribute content outside the system. Registration will also involve setting up a user account, which can allow for more rapid payment mechanisms on download (rather than requiring authorisation from a credit card provider each time, for example).

Figure 9:
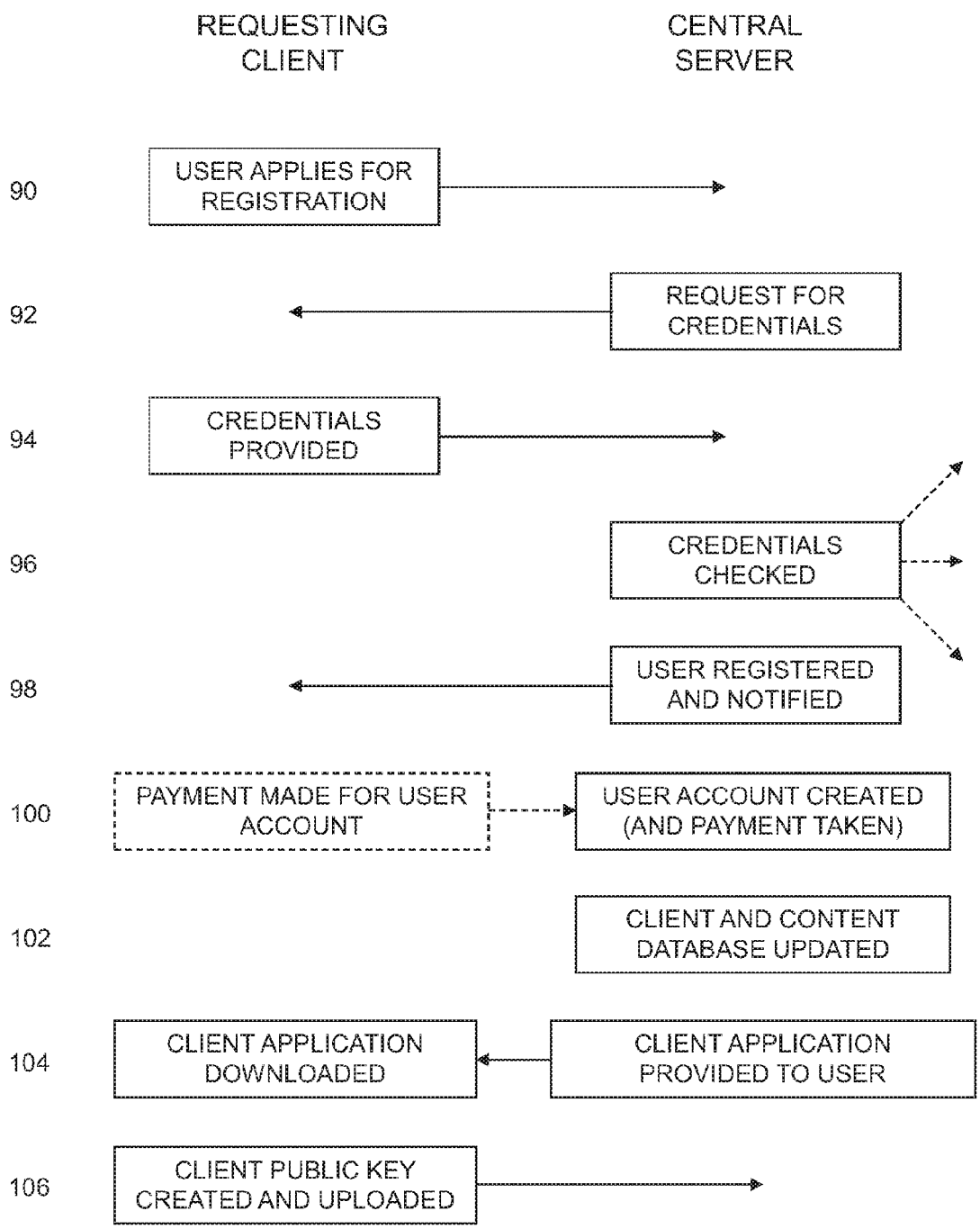
FIG. 9 shows the registration of a new user on to a content delivery system according to embodiments of the invention.

Steps involved in registration of a user are shown in FIG. 9. In step 90, a user applies through his or her client for registration with the content delivery system by a message to the central authority. In step 92, the central authority responds by asking for certain credentials from the user (typically name, address, credit card details, and possibly other proofs of identity or status) and in step 94 these are provided (steps 90 to 94 may effectively be combined by allowing a user to register through a predesigned form accessible from a web page). In step 96, the central authority checks the credentials provided, interacting with other parties as necessary to obtain necessary confirmation or assurance as to the accuracy and value of the credentials provided.

If the central authority is satisfied that the user has provided adequate credentials, the user is registered as a user of the system. The central authority sends a message (step 98) to the user to indicate that the user is registered, and advises the user of the central authority's public key—as will be indicated below, this will be used by the user to determine that tokens associated with content upload and download originate from the central authority—and details for allowing the user to log in to the content delivery system. The central authority may also advise the user of a widely recognised certifying authority (such as Verisign™) that will vouch for the validity of the public key provided.

Figure 10:
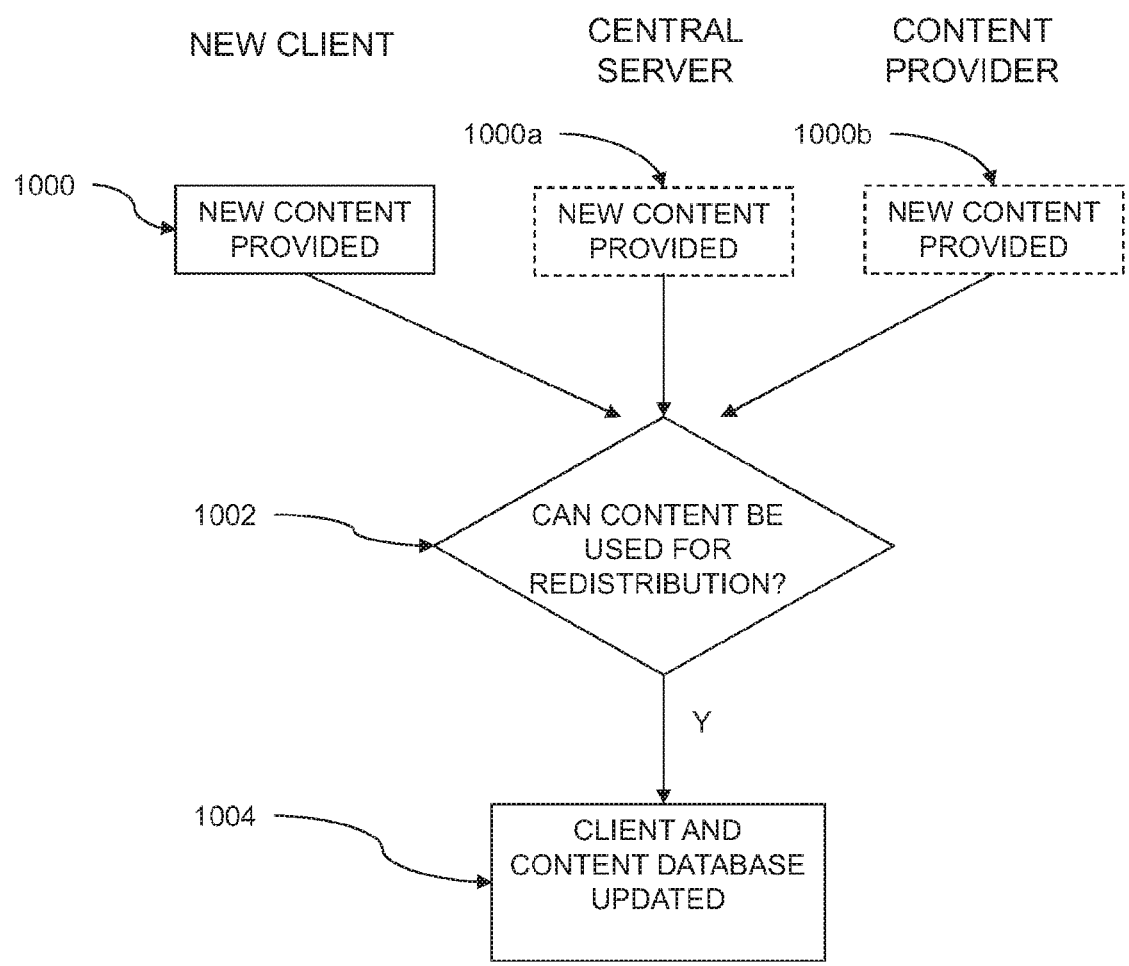
FIG. 10 shows the provision of new digital content on to a content delivery system according to embodiments of the invention.

The central authority creates (step 100) an account for the user, and may take an initial payment at this time—this enables payments for downloads to be handled by account debits, and for replenishment of the account to be decoupled from download activity. In step 102, an entry is created for the user on the client and content database 132. This entry will typically not indicate that the user possesses any content initially, as no content has been downloaded through the system by the user. It is however possible that the user may have existing copies of content that it is permitted to distribute through a content delivery system—in this case, this content may be registered with the central authority, as is shown in FIG. 10. It is not necessary for the user to provide the content item itself to the central authority, but it is necessary for the user to be able to demonstrate 1000 to the satisfaction of the central authority exactly what the content is (so that it can be matched up accurately with other copies of content on the system)—for example, a checksum may be provided as part of the identification so that it can be confirmed that a file is the same version as that held by other users. An appropriate approach is for the peer to divide up the file according to the chunking mechanism to be described below, and to provide a checksum according to an agreed mechanism for each chunk—this is an appropriate mechanism to use, as it matches the approach taken by the central authority in providing authorisation to a downloading peer to download a requested content item. The central authority also needs to establish to its satisfaction that the copy of the content was legitimately obtained, and that the user and the central authority between them possess the necessary rights to allow it to be redistributed over the content delivery system. If the central authority is satisfied (step 1002) that the content can legitimately be redistributed over the system—and that payment can be made to the content provider or their proxy if this is required—then an entry (step 1004) is made on the client and content database to indicate that the user is a client with a redistributable copy of that content item.

When a user joins the system, the client of the user will need to be equipped with an application enabling it to perform the functions of a downloading and uploading peer on the system, as discussed below. This application may be, for example, downloaded 104 from the central authority on registration. As discussed below, in embodiments of the invention a downloading peer uses its own private key to sign messages to confirm that it has originated them. In such embodiments, it is desirable for the client to generate or receive its key pair at this point, and to provide the public key 106 to the central authority at this stage. In different possible arrangements, the client may either be provided with an application that enables the client to generate its own key pairs, or the client may be provided with a key pair by the central authority over a secure channel (in which case the private key is not strictly private to the client—it is also known to the central server), or provided by another trusted source.

Content on the System

As discussed in the previous section, some content may be provided by new users registering with the system. This is not the only model for provision of content. As is further shown in FIG. 10, it will be more normal for new content to be provided directly by a content provider (step 1000*a*), or by the central authority itself (step 1000*b*). If a content provider is registered as a user of the system, the model indicated may be the appropriate one, with the content provider providing one or more clients registered on the P2P system and able to upload content directly to a requesting client—in this case the client and content database would be updated in step 1004 to indicate that each of the content provider clients was able to provide this piece of content.

If the content provider, or an agent acting for the content provider, provides content (or access to content) to the central authority and indicates that the central authority has permission to distribute the content (typically in return for payment for each distribution) over the content delivery system, then the central authority will need to ensure that the content exists at at least one uploading client site. The content provider may provide at least one uploading client site itself, and may use this to provide an initial source of content over the P2P system in the content delivery network. As downloads occur, more clients will also be in a position to upload this content item.

Figure 11:
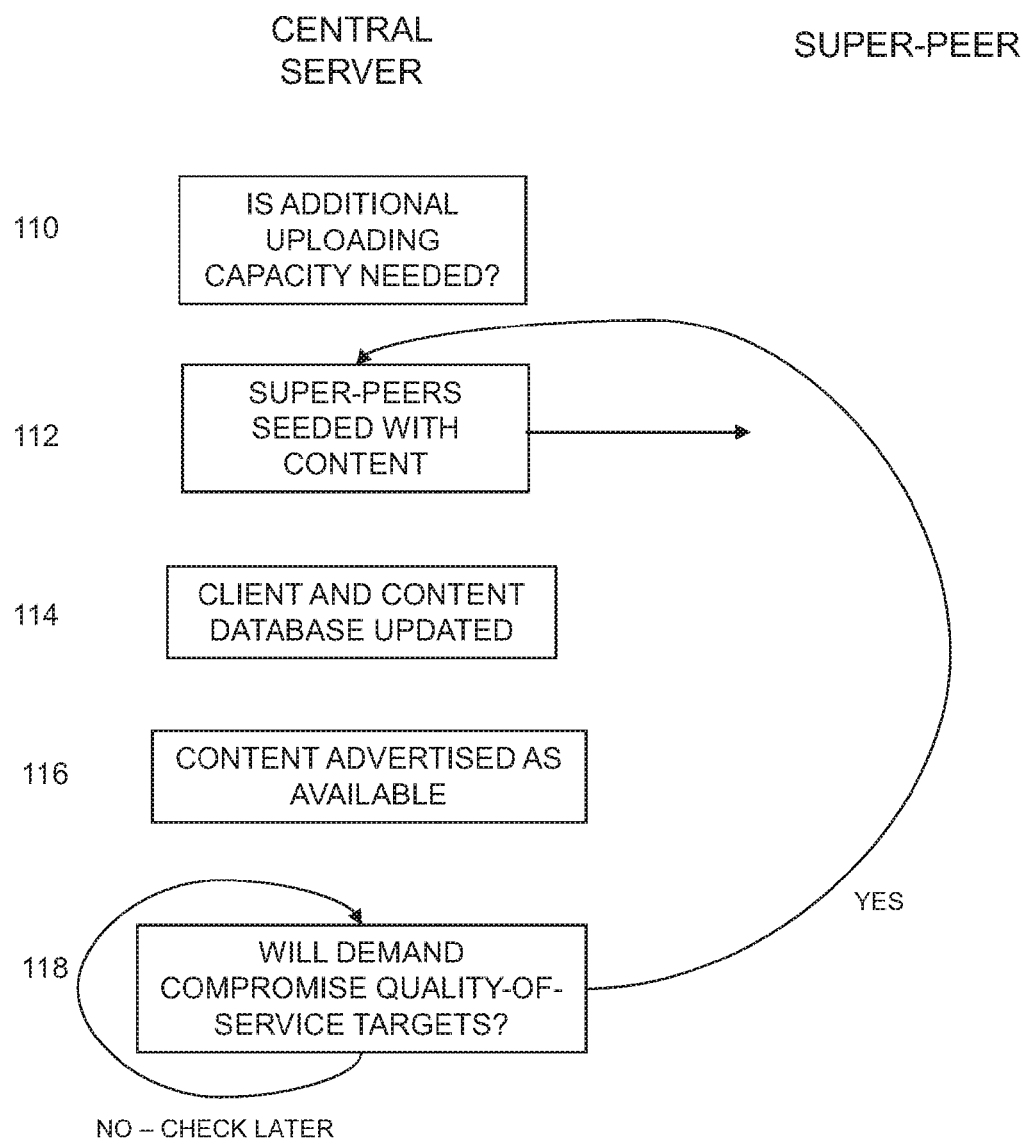
FIG. 11 shows the seeding of peers to improve availability of popular content in a content delivery system according to embodiments of the invention.

To improve initial download effectiveness, particularly if the content is expected to be immediately popular, it may be desirable to seed the P2P network with the content so that it is immediately available for upload from a number of client sites. A process to illustrate this is shown in FIG. 11. The central authority may be aware, or may be able to calculate, (step 110) that there is likely to be a difficulty in meeting quality-of-service goals—for example, a content item will become publicly available at a known time, significant immediate demand is expected, and unless measures are taken, the initial minimal uploading pool will be inadequate to meet demand until a number of downloading sites have received a copy of the content (which they will only do slowly—so the quality-of-service failure will affect a significant number of downloading peers). Certain client sites may be designated as "super-peers"—such sites may be chosen for their ability to provide uploads at a reliable high bandwidth (they may, for example, form part of a third party commercial content delivery network). Content may be downloaded 112 to these sites on request by the central authority (rather than on request by the downloading party, as in the normal content delivery mechanism) and the client and content database updated 114 accordingly, and this may all take place before the content item concerned is advertised as being available on the content delivery system. In other respects, the provision of content to a super-peer may be essentially as described here for provision to any other peer, and the content and client database may be updated in the same way (though the central authority will have a record of which clients are to be considered super peers, and may use this information in determining how a content delivery request should be met—for example, by ensuring that at least some number of super-peers are identified as potential uploading clients if it is possible to do so, or by not using super-peers if there is an adequate pool of conventional uploading peers available).

This seeding of super-peers need not take place before content is advertised—it could, for example, be used if a spike in demand can reasonably be predicted (for example, the public release of related content).

Searching and Requesting Content

As indicated above, the central authority will provide a web page for users to browse and select content. This should allow a user to identify items of digital content unambiguously, and would typically provide additional resources to assist the user in making a selection (such as a search engine able to return hyperlinks for selection of content directly or indirectly, indexes, reviews or links to third party reviews, recommendation lists, or advertising). The central authority will list as available for selection items of content that are present in the content and client database, though it may also indicate that other content items will be available for download at some future time. While content items known to exist at a client site participating in the content delivery system will generally be listed on the content searching web page, not all content items will necessarily be listed. For example, a content item may be embargoed from distribution until a particular date by the content provider, or may not yet be adequately seeded to super-peers to meet expected initial demand.

Once a user has selected a content item for download, they are then invited to log in to the content delivery system. If the user is not yet a registered user of the content delivery system, they will first be required to register as a user. Before content can be provided, the central authority needs to be satisfied both that payment for the content can be made, and that the user is a legitimate user who can be trusted not to redistribute the content item other than through the content delivery system. If the user has credit stored on the content delivery system, he or she may need to allocate a part of that credit to the purchase—alternatively, the central authority may take a payment from the user at this point (this may be through any conventional approach to secure payment, such as through an appropriate HTTPS protocol). The central authority then needs to determine how the content item is to be provided to the user's downloading client.

Determination of Uploading Peers

Once the central authority has determined that the user's request for the content item should be met, it must then determine which of the peers in the network should participate in the uploading process. A possible approach is simply to identify which peers are indicated by the client and content database to be able to redistribute at least a part of the content item, and to identify all of these to the downloading peer. This approach would succeed, but may not be the most effective or desirable approach. In order to improve the efficiency of the process, it may be advantageous to identify only a limited set of uploading peers known or expected to be capable of providing a sufficient quality of service—for example, because they are able to upload at high bandwidth, or because their network location is close to that of the downloading peer. It may also be desirable, for user satisfaction with the service, to allow a user to designate preferred uploading peers so that uploading rewards will pass to those peers rather than to others (for example, friends or family members).

An arbitrary number of uploading peers may be chosen. For efficiency, it may be desirable to designate a maximum number of uploading peers to use, or a maximum number of uploading peers for content size. Super-peers will have been chosen to be among the most efficient peers. Again, it may be desirable to include all super-peers able to redistribute the content item, or all super-peers up to a determined total number (as it may be desirable to allow some of a limited number of total peer numbers for peers which are close on the network to the downloading peer, or for peers chosen by the user). Entirely different models may be employed—it may be decided that in order to maximise return of rewards to users, super-peers will only be used if this is necessary to meet quality-of-service goals (with content uploaded from conventional peers if possible). As indicated above, it may also be desirable for peers which can be identified, from their IP address or otherwise, as being close in network terms to the downloading peer to be included as rapid and efficient transfer between such peers may be more likely than for similar nodes remote from each other.

Acceptance of the content delivery system among users may be promoted by allowing users to identify each other as preferred uploaders—an interface may be provided for this purpose on a web page (preferably a secure web page only accessible to registered users of the system) to designate such preferred uploaders. The client and content database may then be updated appropriately by the central authority, so that when a downloading peer requests content the central authority checks to see which of the preferred uploading peers is able to redistribute parts of the content item. The central authority would then designate some or all of these preferred uploading peers among those to provide the content item to the downloading peer, to the extent that this is consistent with adequate quality of service.

It may be desirable for the P2P network to form the basis of an effective social network, as this may promote user acceptance and loyalty. Selection of uploading peers may influence the effectiveness of this social network, and it may therefore be desirable to develop an uploading peer selection strategy to improve the effectiveness of the social network. The priorities for selection of uploading peers may be as follows (in all cases, an uploading peer will only be selected if they have a part of the content item, or perhaps will be predicted to have a part of the content item in time to participate in the downloading process):

1. Selection of uploading peers identified as preferred uploading peers by the downloading peer. The downloading peer may maintain a list of potential uploading peers with the central server: this list may be unprioritised, prioritised by the user, or prioritised by the central server in accordance with desired criteria (such as allowing each peer on the list to have an equal chance of providing content, of ensuring that the opportunity to provide content is shared between listed peers as equally as possible, or to have more effective peers prioritised).
2. Selection of uploading peers identified as most similar to the downloading peer (and hence most likely to be appropriate for connection on a social network). This would be the result of a data analysis step at the central server based on downloads requested and content availability. An appropriate measure may be a level of similarity of content requested by, or present at, each peer—when a downloading peer requests content, the central server could determine a group of most-similar peers holding the content item requested and including them as uploading peers. This would stimulate social connections between these peers to encourage exploration of content between peers whenever commercial transactions were initiated on the network that utilised peer-to-peer delivery of the digital content.
3. Selection of peers to meet network requirements. These will generally involve ensuring that commitments are met (e.g. fairness to users by ensuring that they have a reasonable opportunity to serve as uploading peers, meeting quality of service guarantees by ensuring that the content item can be downloaded reliably and in a reasonable time). To meet fairness requirements, peers that have had limited opportunities to upload may be favoured. To meet quality of service requirements, peers may be favoured which have known high bandwidth (such as super-peers) or which are close to the downloading peer in network terms.

The list of uploading peers may be unprioritised, may be prioritised, or even (as discussed below) may indicate a suggested download strategy for the downloading peer. It should be noted that it is preferred that the list of uploading peers, and any prioritisation of that list, be determined afresh for each downloading peer, as it will be based at least in part on considerations determined specifically for that downloading peer. While different downloading peers requesting the same content item may conceivably attract the same list of uploading peers as for another downloading peer requesting the same content item, this is not especially likely and it is still more unlikely that two downloading peers would receive the same list of uploading peers with the same prioritisation.

Tokens and Upload

Once the central authority has identified which uploading peers are to be involved in the process of providing content to the downloading peer, it then initiates the mechanism to enable content provision. In a preferred embodiment, this involves the provision of a number of signed tokens to the downloading peer for redistribution to desired uploading peers.

The secure messaging system 182 of the server 18 is arranged to generate a single asymmetric cryptographic key pair. The pair comprises of a private encryption key and a public decryption key. Data signed with the private key can be validated using the public key. Only the public key is revealed publicly and data signed using the public key cannot be validated using the public key. The keys may be held with a certifying authority (such as Verisign™), so that a peer may confirm that the certifying authority verifies the public key as being a public key of the central authority.

The private key is kept secret and is only stored on the regulating server. The public key is distributed to a plurality of uploading peers. This is done at the same time as the software is distributed to the clients. However, it will be understood, that the server may subsequently distribute updated public keys over the Internet to such clients, and/or may distribute different public keys for each peer, or sets of peers.

Once the purchase process has been completed and the uploading peers have been selected, the server 18 acting for the central authority generates a purchase token in the form of an XML file and uses the private key to sign the token. While a single token could be used to cover multiple potential uploading peers, it is preferred that a separate token is generated for every purchase and every potential uploading peer. Each token will contain an identifier (including at least the IP address) of an uploading peer.

The signed tokens are transmitted by the server 18 to the downloading peer which has paid for the content to be downloaded. Each signed token contains an address for a potential uploading peer, and may also indicate which parts of the content item that the potential uploading peer is able to redistribute.

Preferably, the signed tokens are accompanied by a list of the uploading peers, enabling the downloading peer to make a selection as to which uploading peer it wishes to use. Alternatively, the downloading peer may determine a downloading strategy—this may be based on the order in which uploading peers will provide chunks of content (as will be discussed further below). Alternatively, a downloading strategy may be determined by the central server. This may be effectively enforced by the central server, by inclusion in each token, or may be recommended only, in which case it may be placed either in the tokens or in an accompanying list.

The downloading peer may then determine whether it wishes to obtain content from all the uploading peers, or from only some of them, or whether it wishes to follow a downloading strategy proposed. In principle, the user may have active involvement at this stage, but it is expected that in practice this stage (and all stages after the initial purchase of content) will be handled in an automated manner by the application on the user client device. The strategy to be followed by the first peer may be predetermined by the user: this may be simply to follow a strategy proposed in the tokens, a strategy predetermined by the user (for example, to download only from known second peers, or to download as fast as possible) or a default strategy in the client application originally downloaded from the central server.

The downloading peer transmits a request for content to each of the uploading peers chosen and as defined in the signed tokens. This request may be for any of the content item that can be provided by the uploading peer, or for a selected part of the content item. The token may indicate that only a particular part of the content may be provided by a particular uploading peer, and/or that chunks of the content will only be provided in a particular order—if such indications are mandatory, they impose a downloading strategy on the downloading peer (the downloading peer may request that the chunks be provided differently, but the uploading peers would follow the instructions in the tokens as these were provided by the central server), whereas if they are optional, the downloading peer is free to adopt a different strategy. An alternative approach for an optional strategy is for this simply to be indicated in a list accompanying the tokens.

Each of the uploading peers validates the signed token by verifying the token signature using the central server public key.

Therefore, the uploading peers can immediately verify that the downloading peer is authorised to download the content without needing to first cross-query the regulating server 18. Therefore, the uploading peers can immediately start transmitting the requested content to the downloading peer in accordance with any limitations or requirements that may be specified in the token. This facilitates the efficient and timely transmission of content.

Since only the authentication server can sign purchase tokens, the system is secure as long as:

The private key is kept secret.

The signing algorithm remains cryptographically secure.

So long as the system remains secure, peers cannot create forged purchase tokens.

A trusted certifying authority or CA (such as Verisign™) can be used to ensure the public key, as distributed with each client, is in fact the correct public key—a CA may also be able to indicate when a formerly good public key has been revoked. Use of a CA may not be necessary as the public key can be re-downloaded over a secure verified connection (HTTPS) each time the client connects. Compromised clients with bad public keys are to be avoided, as if compromised, there is a risk that they may transfer content items to other nodes outside the content delivery system.

As mentioned, the purchase token is a digitally signed XML file. However it will be understood that the purchase token can be implemented in other formats.

The XML purchase token 40 of a preferred embodiment of the invention contains the following information:

Purchasing User id 401 (there may also be 411 network information about purchasing user, and the public key of the Purchasing User)
    Used by all participants to calculate chunk availability
    Used by uploading peers and central authority to verify communications signed by Purchasing User Pricing information 405
    Purchase price
        Used by the client to generate and display an approximation of rewards in realtime
    Any discount information
        Used by the client to generate and display an approximation of rewards in realtime Uploading Peer ID 402 (there may also be an indication 412 of chunks to download from that peer and network information concerning that peer—if, as is preferred, there is one token per uploading peer, then a token only needs to have information about its own respective uploading peer—as indicated above, this information may include a mandatory or an optional direction as to what chunks should be uploaded by this peer and in what order)

Used by downloading peers to contact uploading peers

Content Information 403, which should identify the content, and should include:

Hashes for each chunk that is available.

The hash is generated using the MD5, SHA1 or a similar hash algorithm and is used by downloaders to verify that a chunk has been sent correctly (is not corrupt). The authoritative source for these hash values is the central server, which generates a hash value for each content chunk and stores this in the client and content database.

Purchase token expiry date 406

Used by uploaders to deny download requests if the token has expired. The central server can use the expiry date to prevent download requests after a given period of time (e.g. after reconciliation has taken place).

After a token expires, the purchaser (downloading peer) is required to request a new token. The choice of expiration times is used to determine the lag time between purchase and reconciliation or cancellation. It is expected that most users will utilise purchase tokens before they expire.

Upload Content Provision

The provision of parts of the content item will now be described with reference to a preferred embodiment of an aspect of the present invention. The approach described allows for efficient distribution of content, and for prediction of how content will be provided (which can allow for requests for content to be made in a more efficient manner).

In a peer-to-peer network, it is advantageous to distribute content as widely and as quickly as possible. For example, peers that are seeding new or popular files will receive a large number of requests to deliver content. In an attempt to alleviate the demand on ordinary peers, super-peers seeded with the initial content may be instantiated by the regulating server, as has been discussed above. Super-peers can be on-demand virtual machines, connected to the public internet, that can be created programmatically on demand and seeded with the popular file. The central authority will make webservice calls to a service provider to create the virtual machine. The central service will include the super-peer in peer lists provided to a downloading peer if the network requires additional bandwidth capacity to achieve desired quality-of-service. Super-peers run the P2P client software and communicate using the P2P protocol. Additional capacity can be added to the network by utilising content delivery networks (CDNs). These networks provide file downloads using the HTTP protocol and may be configured so that they require token authorisation before downloading to a P2P downloading peer. The P2P client will support both the P2P protocol and the HTTP protocol. HTTP supports starting downloads from any point in a file. A preferred approach would be to arrange for only certain chunks of a file to be downloaded from a CDN over HTTP—if this is done, it would be possible to mix the P2P process described here with HTTP using a CDN for a single file delivery.

It is desirable to ensure that content is available to be obtained in an effective way from a number of uploading sites as early as possible in order to meet quality-of-service goals. It may also be desirable to minimise the use of super-peers to that necessary to meet quality-of-service goals—distribution by super-peers may involve set-up and use costs which mean that revenue from content purchase is lost to the system, and that if super-peers are not used, that revenue need only be provided to the content provider, the regular uploading peers and the service provider responsible for the central authority.

As will be described, the approach indicated achieves quick and efficient distribution of content by splitting the file to be distributed into a number of different chunks and then promoting the transmittal of the chunks in a variably sequenced way so that the number of chunks available on the network as a whole is maximised.

Figure 5A:
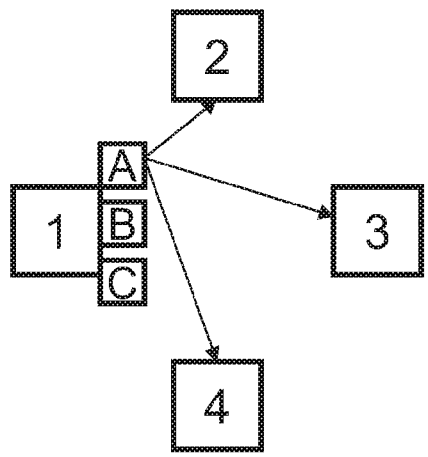
FIGS. 5a to 5f illustrate alternative approaches to the provision of content parts over a P2P network according both to a conventional approach and to an approach in accordance with an aspect of the invention.
Figure 5B:
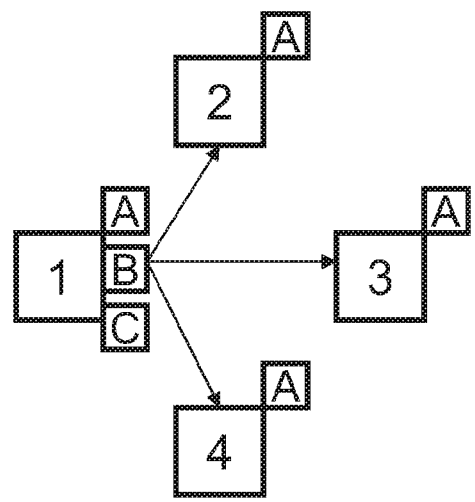
Figure 5C:
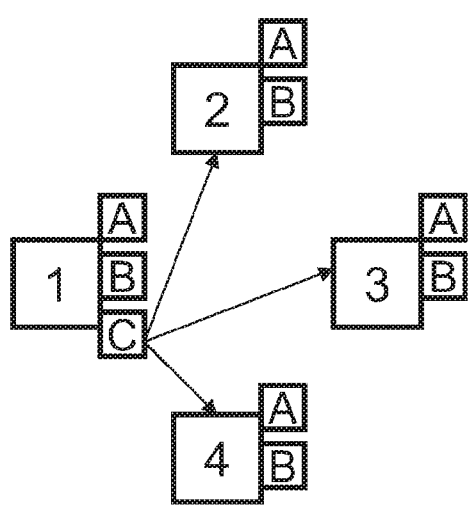
Figure 5D:
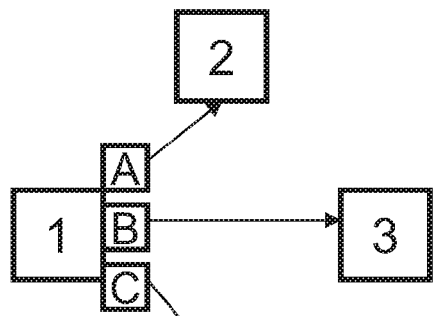
Figure 5E:
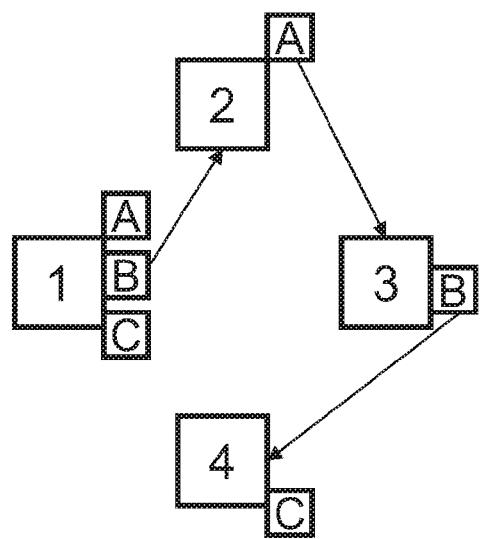
Figure 5F:
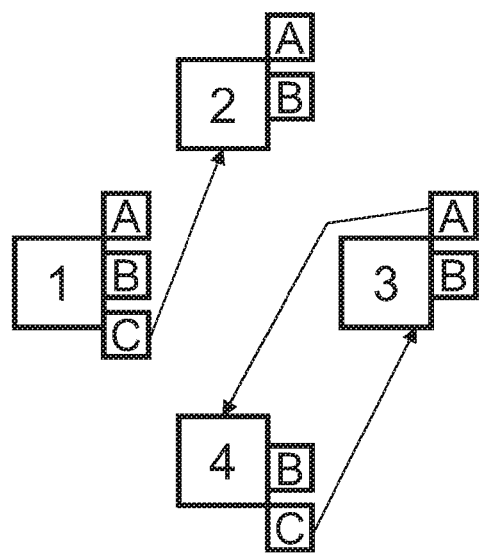

The advantage of transmitting chunks of a file in a variably sequenced fashion will be described with reference to FIGS. 5a to 5f. FIGS. 5a to 5c show the steps of a file transfer process where each of the chunks of a file are transmitted in order from a first peer 1 to a second peer 2, a third peer 3 and a fourth peer 4. FIGS. 5d to 5f show the steps of a file transfer process where the same chunks of a file are transmitted in a variably sequenced fashion.

Referring to FIG. 5a, the first peer 1 is the only peer on the system comprising the whole file to be distributed to the remaining peers on the network. The file is split equally into three chunks—a first chunk A, a second chunk B and a third chunk C.

It will be understood that the uploading bandwidths for each of the peers is limited. For the purposes of this example, the upload bandwidth is the same for each peer, and is fixed notionally at being able to transfer one chunk A, B or C within a period of one minute.

In the first step shown in FIG. 5a, the first peer 1 transfers a copy of the first chunk A to the remaining peers 2, 3 and 4. Assuming the first peer's uploading bandwidth is equally split into a third for each transfer, it will take three minutes for the first chunk A to be transmitted to the remaining peers 2, 3 and 4.

In the next step of the ordered file transfer, as shown in FIG. 5b, the first peer 1 transfers a copy of the second chunk B to the remaining peers 2, 3 and 4. There is no other source for the second file chunk B. Again, this takes another three minutes as the uploading bandwidth of the first peer is divided in three.

In the last step, in the same way, the remaining third chunk C also takes three minutes.

Therefore distribution of each of the chunks to all of the peers takes an aggregate period of nine minutes when ordered chunk transmission is adopted.

Referring to FIG. 5d, the first step of the variably sequenced file chunk distribution process is shown. In this case, the first peer 1 simultaneously distributes the first file chunk A to the second peer 2, the second file chunk B to the third peer 3 and the third file chunk C to the fourth peer 4. Again, in this case, the uploading bandwidth is split into three, and so each of the respective transfers takes three minutes in total.

In this first step, the number of different chunks of the file to be distributed has been maximised, and thus can be exploited as described in the subsequent steps:

In the next step, as shown in FIG. 5e, the first peer can transfer the second file chunk B to the second peer 2. The second peer 2 can, at the same time, transfer the first file chunk A, acquired by the second peer 2 in the first step to the third peer 3. Also, at the same time, the third peer 3 can transfer the second file chunk B to the fourth peer 4. Since the upload bandwidths of each of the peers 1, 2, 3 and 4 is independent from one another, each of these three transfers occur simultaneously, and take an aggregate period of one minute.

In the last step of the variably sequenced file transfer process, as shown in FIG. 5f, the first peer can transfer the third file chunk C to the second peer 2. At the same time, the third peer 3 can transfer the first file chunk A, acquired in the second step to the fourth peer 4. Also, at the same time, the fourth peer 4 can transfer the third file chunk C to the third peer 3. As with the second step, these three transfers occur simultaneously, and take an aggregate period of one minute.

Therefore, the total period taken for the file to be distributed from the first peer 1—the initial seeding peer—to the remaining peers 2, 3, and 4—is only five minutes. This is a significant time saving over the ordered file transfer as described in FIGS. 5*a* to 5*c*.

Therefore, in order to maximise file chunk propagation, it is better for each downloading peer to download a different chunk from the uploading peer. In the next step, downloading peers can download the chunks they need from each other as well as from the original uploading peer.

Thus, it can be seen that variably sequenced chunk distribution is very useful in maximising file chunk propagation throughout the network. In order to maximise the variably sequenced chunk download benefit, it is best where downloads are to be satisfied from different peers that the different uploading peers should provide different chunks. This can be accomplished by a different starting point being chosen for each downloading peer to begin its download, for example a starting point based on a deterministic function that could include as inputs the User ID of the downloading peer and a unique product identifier. Use of the User ID enables different uploading peers to upload in different orders.

The choice of the first chunk to upload for each peer will thus be determined by User ID, and hence a spread of different first chunks will be provided by different uploading peers. There are alternative approaches for providing second and subsequent chunks, however. These are that each peer can either download chunks sequentially from the starting point or download chunks in a pseudo-random order from the starting point using a PRNG (pseudo random number generator). An advantage to downloading in a sequential order from the starting point is that it is more processor efficient and easier to understand—there may in some circumstances be availability advantages in using a pseudo-random order, particularly if this results in a different sequence of chunks from one uploading peer to to another.

Using a variably sequenced ordering may be beneficial if it improves chunk availability. However, a drawback of such variably sequenced file chunk order is that the availability of a particular chunk on any given peer that has not yet downloaded the entire file is unknown.

One way to overcome this problem is to allow peers to communicate with one another to find out about chunk availability. However, such communication is another overhead that consumes bandwidth that can otherwise be used to distribute content. Also, in a regulated P2P network, the regulated server may strictly control the visibility of one peer to another for security purposes. Peers will not reply to any communication from other peers unless that communication in includes a secure token signed by the central authority. The regulating server is therefore responsible for determining the availability of chunks. Therefore, information about the availability of chunks would either need to be stored on, or need to pass through the regulating server. This can increase the load on the bandwidth of a regulating server significantly, in addition to storage requirements. In addition, this overhead communication increases significantly in the situation where the file to be distributed is new or popular, and a large number of peers that have not fully downloaded the entire content file.

Therefore, it will be appreciated that whilst variably sequenced file chunk ordering is useful for maximising chunk propagation (particularly with regard to variation in start point), it would appear to create the requirement that file chunk availability needs to be communicated between peers and perhaps also be stored on the server, consuming storage and bandwidth. However, this need not be the case if the downloading peer is able to predict availability, as will be discussed below.

As indicated, in a preferred arrangement the present peer-to-peer system utilises an algorithm that predefines in which order downloading peers download chunks of a file based on characteristics of the downloading peer, and the file being downloaded, with these characteristics being known to other peers who can then themselves predict this download order. The algorithm also may be used to set a pseudo-random order so as to boost the chance of chunk availability.

In a preferred arrangement, chunk sizes are predetermined for a given set of file sizes. For example, files under 128 MB could have 128 Kb chunk sizes. Files under 4 GB could have 1 MB chunks sizes. The last chunk of a file will have a chunk size that may only be 1 byte (depending on the size of the whole file) but for remuneration purposes, each chunk will be considered equal (remuneration is calculated on a per chunk basis not on a per byte basis). Each chunk will need a hash stored on the central server. Smaller chunk sizes will increase storage space requirements on the server (as well as the size of purchase tokens) whilst bigger chunk sizes will decreases how many users can be remunerated per file and increases the transfer overhead when downloaded chunks are found to be corrupt. As chunk sizes are predetermined, the central authority is able to divide new content on the system into the same chunks as will be produced by any peer, and can generate checksums of the content to be stored on the content and client database.

As indicated above, once the server 18 acting for the central authority has completed the content purchase process with a downloading peer, it effectively sends a download list (advantageously in the form of a series of tokens together with a summary list) to the downloading peer. The download list contains the IP address of a number of other peers on the network that are in the process of, or have completed downloading the particular content to be downloaded by the downloading peer. The list also contains characteristics of each peer.

The downloading peer calculates its own file chunk download order by running its own characteristics and the characteristics of the file to be downloaded through the download order algorithm. It then calculates the chunk download order of each of the peers on the list in the same way in order to determine which of those peers have in their possession the chunk of the file required to be downloaded next.

The algorithm can be applied iteratively over time, so that the downloading peer has an up-to-date approximation of file chunk availability on the network over time.

The same algorithm is applied by the regulating server in order to maintain the accuracy of the peer lists for each peer and file.

The algorithm is optimistic; this means that peers will always assume that a chunk is available when indicated to be so by the approximation. If a chunk, when requested, is not available, the peer will pull back and assume it has used out of date performance characteristics for the uploading peer or that the file has been deleted or moved by the uploading peer. Reports to the central server about chunk unavailability can be used by the central server to readjust peer performance characteristics and register moved/deleted files.

Figure 6:
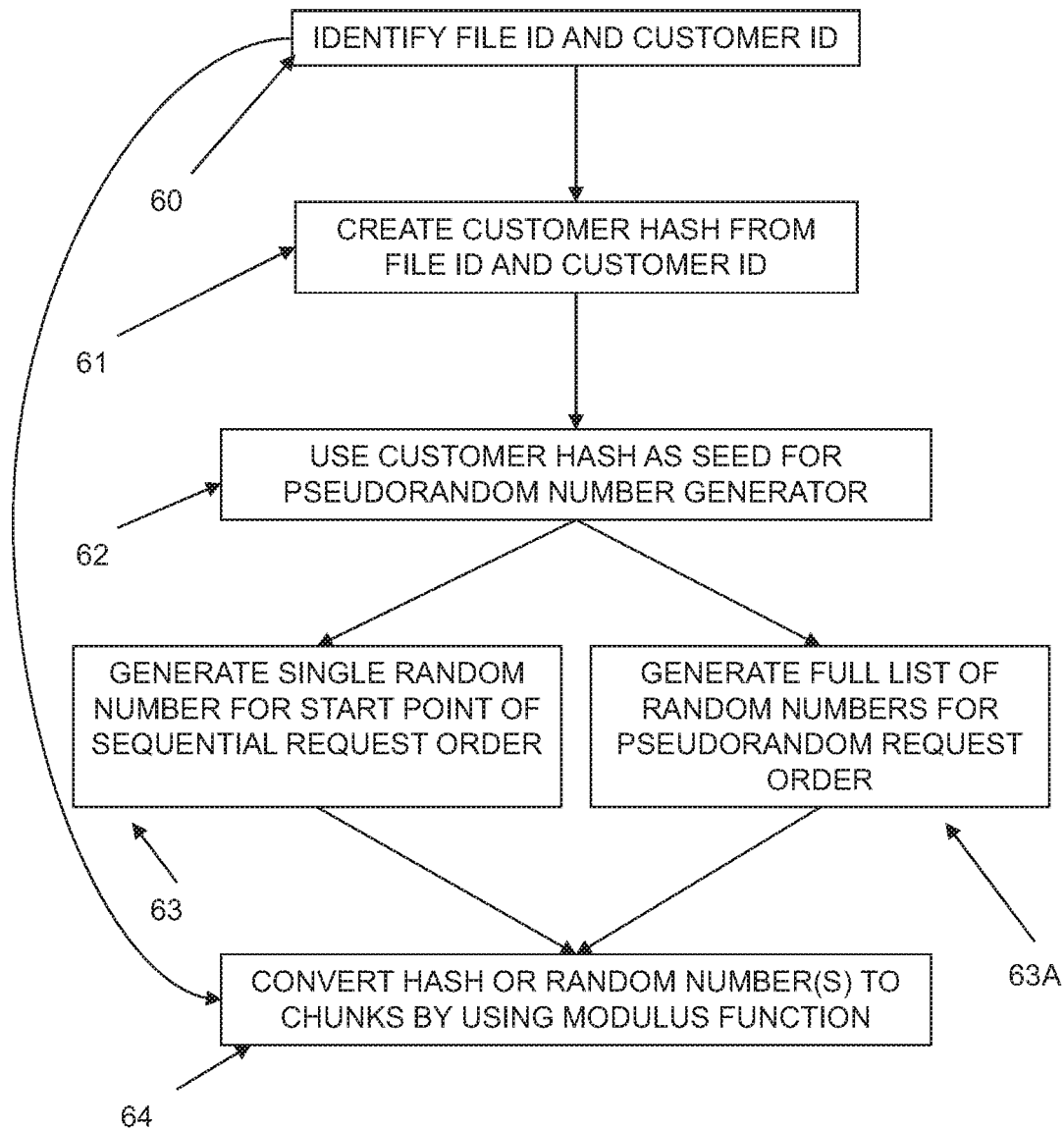
FIG. 6 shows a method for determining an order of provision for content parts determined by the identity of the sender in accordance with embodiments of the invention.
Figure 7:
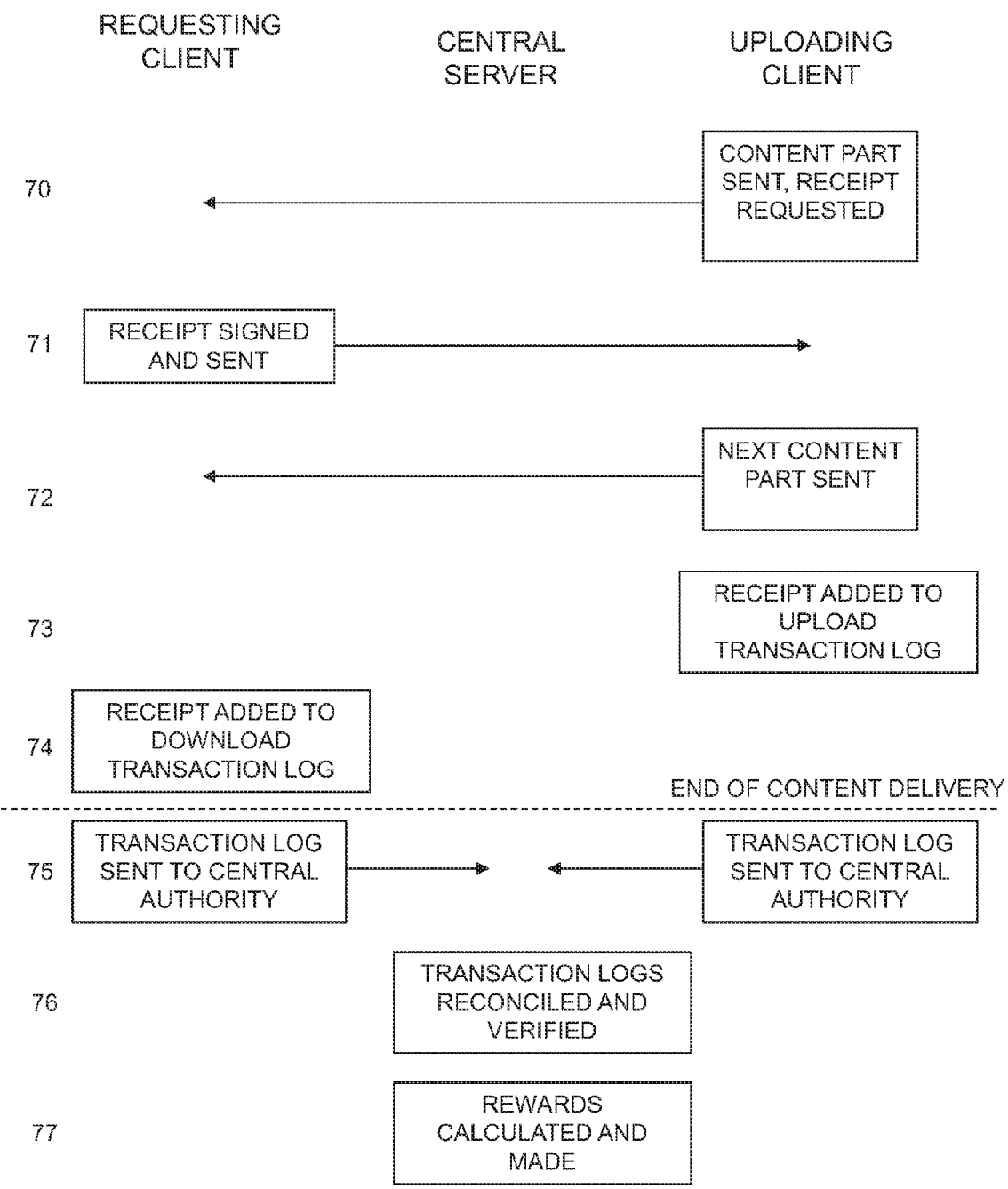
FIG. 7 shows a method of providing receipts for received parts of digital content in accordance with embodiments of the invention.
Figure 8:
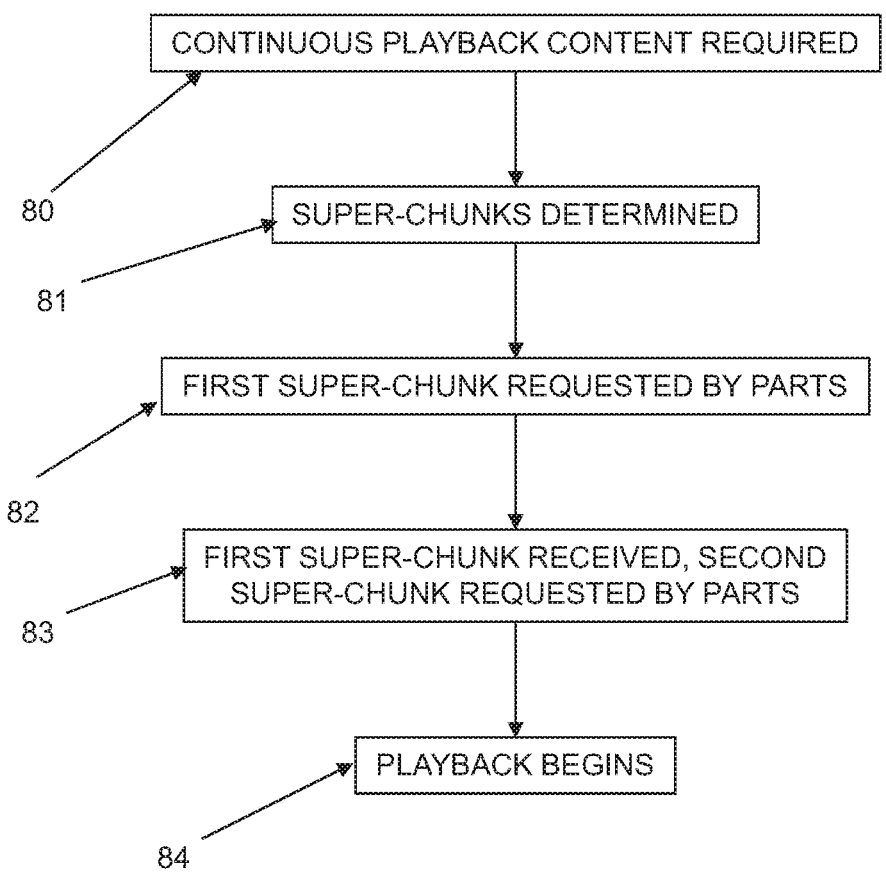
FIG. 8 shows an approach to provision of digital content to allow playing of the digital content to start before it has all been downloaded in accordance with an embodiment of the invention.

This approach is illustrated with reference to FIG. 6.

The download chunk order algorithm is applied as follows:

The index of the chunk to start downloading from for each peer must be as unique as possible for each peer and file. The index can be pseudo-randomly chosen by identifying (step 60) the following inputs and then applying (step 61) a simple hash function to them:

The User ID of the downloading peer

The product id or product hash

Additional inputs (for example, the User ID of the uploading peer) may also be used. The result of the hash function may be used directly, or may be used to seed a pseudorandom number generator (step 62) which produces a pseudorandom number (step 63) which is turned into a chunk index by applying an appropriate modulus function (step 64) to the result with the number of chunks as the modulus operand.

It is understood that any hash function can be used to generate the hash value. A simple XOR based hash function whereby the hash is the result of all the inputs XORed with each other.

hash=userid XOR productid index=hash MOD chunkcount

A cryptographic hash function should be used to provide better random distribution of the starting points. Many cryptographic hash functions are available such as MD5, SHA1.

Any server or peer that has the hash inputs for a given peer will be able to calculate the index of the starting chunk for that peer.

When not using a pseudo random number generator, the chunk order can be determined by using the following steps:

Hash the combination of the User ID and Product ID.

Perform a modulus function on the hash with the number of chunks to get the starting chunk index.

From there, chunk order is determined in sequential order from the start chunk index wrapping around from the end to the start using the modulus function.

When using a pseudo random number generator, the chunk order can be determined using the following steps:

Hash the combination of the User ID and Product ID using cryptographic hash for simple hash (choice of hash algorithm determines performance or better random distribution) (step 61). This customer hash can theoretically be generated by any peer or server and is not secret.

Use customer hash as the initial seed for a chosen PRNG algorithm (step 62).

Sequentially generate X random numbers using the PRNG (step 63a).

Assign each generated random number to a chunk to be downloaded.

Random number to chunk allocation is performed as follows:

Modulus function is performed on random number with the total number of chunks in the file as the modulus operand (step 64). The function result is the chunk number.

If there is a collision (modulus function returns a chunk number already previously returned) then the next available chunk (walking linearly and wrapping via modulus) is used.

The chunk availability of a file for an individual peer can be approximated using the following information:

The calculated chunk order for the peer and file (as discussed above) (this may be calculated on the fly, and cached on the client)

The number of chunks in the file (stored on central server)

Time since file purchased in seconds (t) (stored on central server)

The size of each chunk for the given file in Kb (K) (stored on central server)

A peer's average download speed in Kb/s (S) (stored on central server)

For PRNG based chunk order calculation, the chunk order for peer "P" is stored as an array of chunk IDs indexed starting from 0. A chunk of id "C" at index "I" is available to download from the peer "P" if the following formula is satisfied:

$$\frac{K}{S} \times (I+1) < t$$

For sequential chunk order calculation, the chunk order for peer "P" is calculated on the fly simply by knowing the starting chunk ID. Chunks are considered to have decreasing levels of availability as the chunk index increases (taking into account the index wrapping around at the end).

This approach involves the request of specific chunks by the downloading peer, in which case the calculation could be made by the central server (specifying a download strategy for the downloading peer) or by the downloading peer itself.

Variant—Superchunking

A variant to the above approach which is suitable for streaming-like provision of content such as audio and video files, will now be described A problem prevalent with the above download order algorithm is that the entire content needs to be downloaded before it can be utilised—e.g. an entire video file must be downloaded before it can be played. This means there is a significant delay between selecting a file to be downloaded, and the utilisation of that file—particularly playing audio or video files.

In a client-server model, streaming methods can be used to overcome this problem such that the file to be played is downloaded in a format that supports streaming, and also, the file is downloaded in an ordered (chronological) order so that playback can be commenced before the entire file has been downloaded.

Such a model is unsuitable for P2P networks that are set up for unordered downloading of chunks of a file. As mentioned above unordered or random downloading of chunks of a file is useful because it maximises chunk availability and subsequent propagation.

The following algorithm aims to retain this advantage, whilst providing a way to permit streaming of content such as audio or video files.

In order to be suitable for use in this approach, a file needs to be in a suitable container format, such as MP3 for audio, MP4 for video using a codec that allows for streaming such as MP3 for audio and h264 for video. This allows a file to be divided into a series of playable parts, here termed as "super-chunks".

Files are divided into super chunks by having a predefined super chunk size for various file sizes. For example, files under 128 MB could have 1 MB sized super chunks and files under 4 GB could have 10 MB sized super chunks.

The chunk approximation algorithm can be modified to facilitate streaming by dividing the file into larger chunks (known as "super chunks"). These super-chunks encompass several normal chunks (as described above). The super-chunks will be numbered from 0 to N when content is requested in this form (step 80) starting with the first super-chunk at the start of the file to the last super-chunk at the end of the file. Super-chunks will be downloaded in order (step 81) from 0 to N, or in an order which ensures that each super-chunk will be available to be played substantially without interruption when the preceding super-chunk in the sequence has finished playing. Within each super-chunk, normal chunks will be downloaded according the chunk approximation algorithm described above beginning with a first super-chunk (step 82). Playback (step 84) can begin after the first super-chunk has finished downloading whilst the second super-chunk is downloading (step 83).

This modification will allow files to, in general, be downloaded from start to finish whilst maintaining a certain element of download randomness (within each super-chunk) to facilitate high availability of any random chunk very early on. A downloading peer may request that an item be provided in this form to the central server (in which case the central server may provide an appropriate downloading strategy for the downloading peer), or the downloading peer may simply calculate an appropriate downloading strategy to achieve this result.

An appropriate transfer protocol should be used for providing chunks over the network. This protocol should be based on UDP, rather than TCP itself, as TCP will have difficulties transferring content items of this type through firewalls and through networks using Network Address Translation (NAT).

The protocol is a UDP based TOP-like protocol that allows reliable file transfer, writing parts of the file as they arrive rather than writing them in order (1, 2, 3, . . . 100). When packets get lost in the network, only the packets that have failed to be delivered will need to be redelivered (and not necessarily by the same sender).

TCP was designed for reliable, stream-based delivery. In other words, TCP not only guarantees delivery, but it guarantees delivery of packets in the order in which they were sent. UDP offers non-guaranteed delivery of packets but can be used to open ports in firewalls to allow peer to peer connections. Other connectionless protocols can also be used for this purpose. The person skilled in the art will determine how effective transmission of content can be made using this type of approach.

Receipting and Rewards

When a chunk is safely received by the downloading peer, it can check that the chunk is valid by comparing it with a checksum for that chunk (desirably, these checksums are provided with the tokens—alternatively, they can be made available by the central authority for use by the downloading peer at any other point in the process). When the chunk is confirmed to be valid by the downloading peer, it provides a receipt to the uploading peer. This receipt may also include a measurement of the performance characteristics of the download (for example, the length of time between request and satisfaction of the request, any failures or retries involved in the process).

As will be described below, such receipts can be used in fair rewarding of uploading peers according to an embodiment of an aspect of the invention.

As mentioned, in order to provide an incentive for users to join a regulated peer-to-peer network, it is necessary to reward those users for participation in that network. This can be achieved by passing a share of the revenue generated by payment by a downloading user to an uploading peer that has taken part in delivering the content to the downloading user. Essentially, the uploading peer is being rewarded for storing the content and also providing the uploading bandwidth to deliver the content.

In order to reward uploading peers fairly, it is necessary to track and regulate every transaction that occurs between the uploading and downloading peer. If this is not done, then the regulated network may be adversely exploited leading to either non-payment for content, unfair rewarding or even no rewarding of uploading peers.

Therefore it is important to securely implement the tracking and regulation of transactions between peers on the regulated peer-to-peer network. Unfortunately this leads to a large amount of superfluous information on the peer-to-peer network, even with the tracking/regulation of a simple transfer of a content file from a single uploading peer to a single downloading peer:

Existing, regulated reward-based P2P networks (such as Grooveshark™) typically involve the use of a central authority (server, or group of servers connected to the Internet) to clear payment for a file, the central authority then provides a mechanism for a single uploader to verify via a web service, that payment has been cleared, upon the downloader requesting the file from the uploader. The uploader must then transfer the entire file to the downloader, at which point the downloader notifies the central authority via a web service that the download was successful, at which point the uploader is rewarded for uploading the file, either by credits entered onto their account or monetary reward.

As mentioned above, one of the key advantages of a peer-to-peer network is the ability for a content file to be simultaneously downloaded from multiple sources for the purposes of distributing bandwidth usage and content availability. However, this further exacerbates the problem being able to track and regulate transactions between peers (e.g. transactions between multiple uploading peers and a downloading peer), and also calculating the reward due to each uploading peer fairly.

The approach described provides a way in which uploading peers can be fairly rewarded for their contribution, whilst retaining the advantage of multiple sources and at the same time minimising the drawbacks associated with accounting, tracking and regulation of file transfers between peers.

At the end of transmitting each file chunk, the uploading peer expects or requests 70 a valid receipt before it uploads any further file chunks.

The downloading peer provides 71 a receipt to the uploading peer that is signed with its private key. The uploading peer can verify this receipt using the secure token (which includes the public key of the downloading peer)

If the receipt is valid and correct, the uploading peer continues to upload 72 the next file chunk to the downloading peer.

The uploading peer enters 73 the receipt into an upload transaction log.

The downloading peer enters 74 receipt of the chunk in a download transaction log Transaction logs are then transmitted 75 to the central authority at some point after the file transfer has been completed The central authority processes 76 both of these logs verifying all the uploader logs against downloader logs, and the relative quantities of data transmitted by uploaders.

The central authority allocates 77 rewards on a pro-rata basis to all uploaders, based on the quantity of chunks they successfully transmitted to downloaders. These rewards are applied to each user's rewards account.

Upload and download receipts are sent to the server (primarily to claim rewards) in sets named Transaction Logs. Sending upload receipts as Transaction Logs reduces time and data overhead associated with sending receipts individually. Also, transfers only take place periodically (to give time for all uploaders to make claims) avoiding real-time submission of upload receipts, which can be bandwidth consuming for the server. (Transfers can be arranged to take place during periods of low network usage). Additionally, if such real-time receipts need to be acknowledged before the uploader continues transfer of additional chunks, this could slow the entire system down.

As indicated above, the number of chunks for any given file is dependent on the size of the file All peers have one or more digital key pairs used for signing (the public key for each digital key pair is registered with the central server for use in validating receipts). A cryptographic algorithm is implemented in the client peer-to-peer application, and public/private key pairs are generated by either the server and the client or both server and client during application installation on a computer, or during registration of the application with the central server.

Upload receipts are XML or binary files used by uploading peers to provide evidence that they have uploaded to another peer.

An upload receipt is a signed XML or binary file containing:

Date/Time stamp for start/finish time of chunk upload.
Performance characteristics with the exchange.
Uploader and downloader IPs.
Network conditions (including firewall, NAT conditions).
A copy of the purchase token provided by the downloading peer.

Uploading peers are permitted to examine the contents of the receipt but are prevented from altering the contents of the receipt (the receipt is signed by the client that issued the receipt).

Uploading peers are permitted to include amendments to the receipts. The system is able to determine the source of the amendments, since each amendment is cryptographically signed by the peer making the amendment.

If a downloading peer does not provide a receipt to the uploading peer, the uploading peer can choose to not send further chunks to the downloading peer and report the discrepancy to the central server. Multiple discrepancies for a specific peer can be used by the server to identify mal-downloaders (peers that download from other peers but do not provide receipts).

The logs are provided to the central authority to allow effective reconciliation of payments but in such a way not to provide a drain on network and processor resources. This is implemented by allowing the central server to poll peers for receipts, and the central server can then determine a sequence to download receipts from each client. This would typically be performed over redundant client-server bandwidth. There will also be a mechanism for any peer to notify the server that the peer has receipts that have not yet been uploaded to the central server.

In addition to providing payments to effective uploading peers, use of the transaction logs allows the central authority to make further determinations concerning the status of peers on the system, and this may be used to determine which peers should be offered further uploading opportunities. The central authority may use the download characteristics reported by the downloading peer to assess the relative effectiveness of different uploading peers. This may be used to provide a relative effectiveness rating for uploading peers which may be recorded in the content and client directory and used by the central authority in making decisions concerning uploading peers to be selected for future content delivery. The central authority may also compare receipts with data appended by uploader—this allowing the central authority to identify downloaders who misreport performance characteristics at the expense of fair uploaders. Identifying misreporting downloaders is important as performance characteristics can be used by the server when selecting peers for sharing (affecting the earning potential of a peer).

Mobile Devices

As indicated in FIG. 1, a user client, and hence a peer on the P2P network, may be a mobile device such as a notebook computer or a cellular telephone. In principle, such a mobile client could take the role of an uploading peer or a downloading peer. In practice, this may not be the most effective way for a user to obtain a content item containing a significant quantity of data, as mobile devices may only be able to access high bandwidth connections at certain points, and it may be desired to obtain a content item at a time when there is limited bandwidth available for the user device.

Moreover, it is likely that a user will wish to view a content item such as a movie at home (where he or she has access to an always-on high bandwidth connection) rather than with his or her mobile device.

Figure 12:
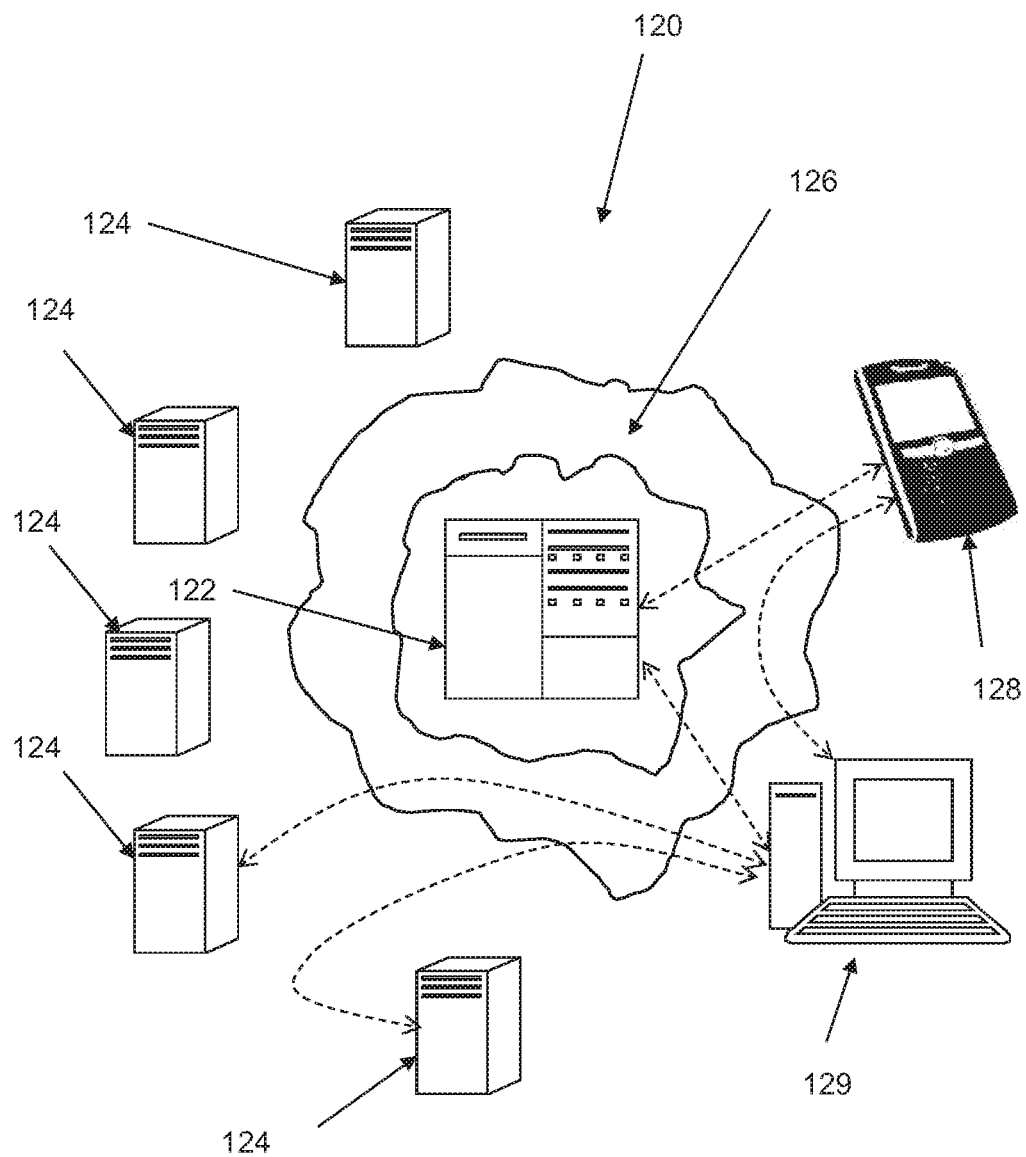
FIG. 12 shows a system for downloading digital content to a user's client after a request for the digital content is made from the user's mobile device.
Figure 13:
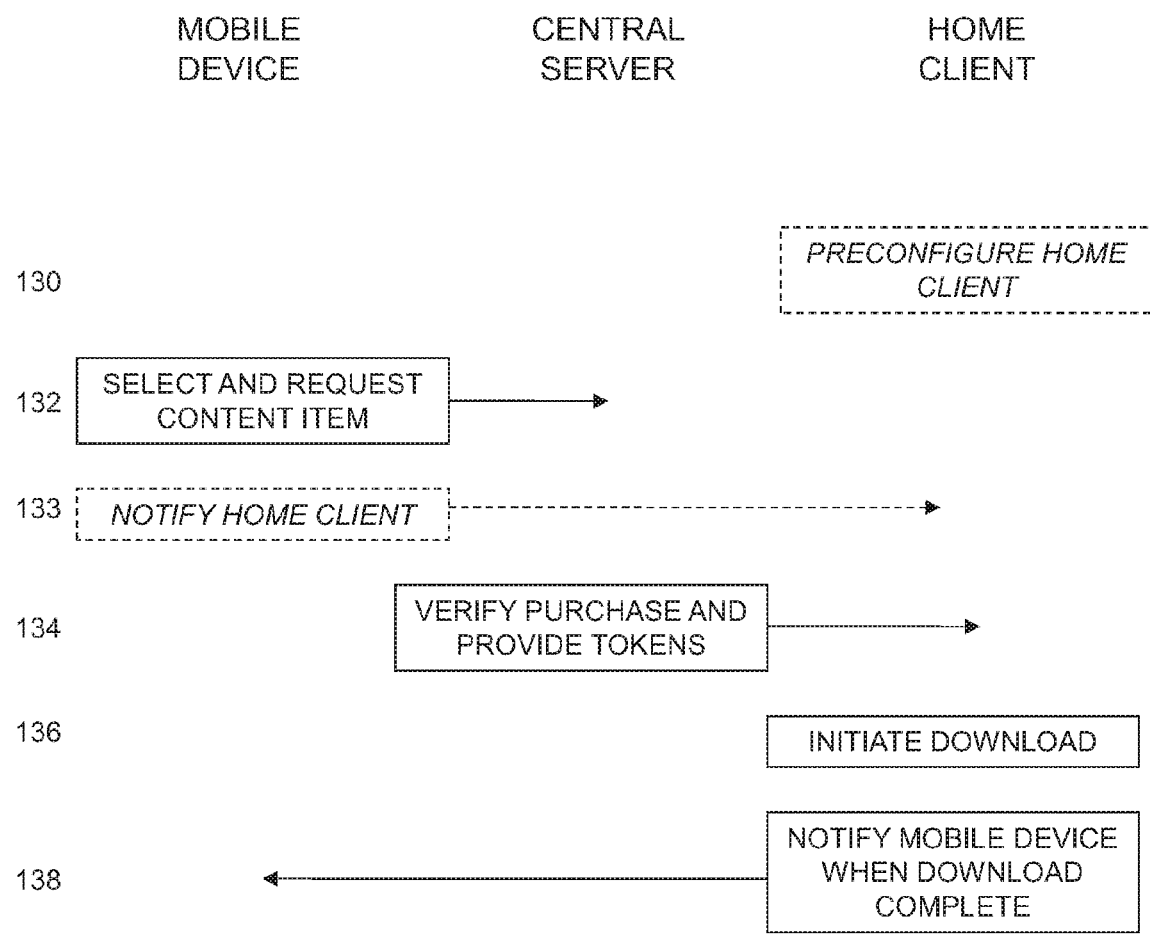
FIG. 13 shows a method of downloading digital content to a user's client after a request for the digital content is made from the user's mobile device.

FIGS. 12 and 13 indicate an arrangement by which the P2P network described above may be used effectively in this situation. FIG. 12 shows a system 120 of the type broadly described above, with a central server 122 and a number of uploading peers 124 accessed over network connections which include the public Internet 126. The user is represented by two devices: a mobile device 128 and a home client 129 with a high bandwidth broadband connection.

A user may wish to obtain a piece of digital content when travelling, and only able to use his or her mobile device 128. For example, the user may read a movie review or hear an audio track and decide that he or she wants to download a copy. To do this, the user accesses 132 the content purchase website of the central server in the same manner as described above to select the content item and to make the purchase. There are no special issues in obtaining user access to the account from the mobile device—the user is able to enter the secure site using their account details and password information.

The account will be linked with the user's home client, so there are also no special issues associated with the central server actions—the central server can determine whether the content can be redistributed, can identify uploading clients and provide tokens 134 all in the manner described above. The first practical issue is associated with home client 129—as home client 129 did not initiate the purchase, it will not be configured to act appropriately to continue the download process unless appropriately instructed.

This can be achieved in a variety of ways. In a first alternative, the home client could be configured 130 simply to act directly to download 136 an item of digital content in the manner indicated above when tokens are received from the central server—the tokens and lists between them containing sufficient information for the home client to organise the download. This approach would appear to create some risk of error or fraud, but this risk may in fact be low as the tokens are signed by the central server private key, so the P2P application at the home client will be able to determine with confidence that the tokens originate from the central server. The list may also indicate explicitly that the content has been requested by the user's mobile device, and may include some form of authorisation code agreed between the central server and the user to that effect to provide additional confirmation.

In a second alternative, the user may communicate 133 from the mobile device 128 to the home client 129 to indicate that a content item has been requested and is to be downloaded. This requires an application to be running at the home client 129 which is able to receive messages from the download device, or possibly for an application to run which can be logged into by the user from the mobile device—this can be provided as a part of the client application downloaded from the central server as part of the user registration process. If desired, the user could be notified at the mobile device when tokens have been received and requested to make decisions about the downloading process—however, it is expected that this would not generally be required, and that downloading would take place automatically according to established preferences and processes, with defaults established by the central server and modified by the user if desired.

The download process then continues essentially as indicated above without further need to involve the mobile device 128. The content item is received in chunks as before, receipts for each chunk are provided by the home client, and the home client will be able to determine that the content item has been safely received in full. At this point, the home client 129 may provide a message 138 to the mobile device 128 to indicate that the content item has been safely downloaded. The content item can then be played by the user when the user is again in a position to access the home client directly.

The invention claimed is:

1. A method of providing digital content over a peer-to-peer network, comprising:
   a user requesting a central authority computing system to authorize the download of an item of digital content to a first peer associated with the user;
   the central authority identifying a plurality of second peers from whom the item can be downloaded;
   the central authority preparing a plurality of tokens, each of the plurality of tokens being associated with a respective one of the identified plurality of second peers, wherein each such token identifies the first peer, the second peer with which the token is associated, and the item of content requested by the first peer;
   the central authority sending the plurality of tokens to the first peer;
   the first peer sending to each one of the plurality of second peers, one of the plurality of tokens, each token identifying the first peer, the second peer to whom the token is sent, and the item requested by the first peer, with a request for a part of the item from said second peer;
   wherein the second peers receiving said token transmits the requested part of the item to the first peer.

2. A method as claimed in claim 1, wherein before preparing the at least one token, the central authority determines and takes a payment from an account associated with the first peer; and wherein on taking the payment, the central authority allocates a portion of the payment to be provided to at least one of a content provider and second peers.

3. A method as claimed in claim 1, wherein at least one of the tokens associated with a second peer indicates which of the parts of the content item should be uploaded by that second peer for download by the first peer.

4. A method as claimed in claim 1, wherein the user requesting step is made through one of the first peer and a computing device remote from the first peer.

5. The method as claimed in claim 1, wherein the first peer determines partitioning and requesting of a data file of the item of digital content by:
   identifying a plurality of parts into which the data file is to be partitioned;
   determining an ordering of the plurality of parts dependent upon a number representing a client identity;
   determining a part of the data file to be requested on the basis of the determined ordering; and
   requesting the part of the data file in accordance with the determined ordering.

6. A method for a central authority computing system to control the delivery of digital content items over a peer-to-peer network, comprising:
   registering, at the computing system, peers as able to participate in content delivery over the peer-to-peer network;
   receiving, at the computing system, a request for a digital content item from a first peer;
   identifying, at the computing system, a plurality of second peers from whom the item can be downloaded;
   preparing, at the computing system a plurality of tokens each identifying the first peer and one of the plurality of second peers, and sending the at least one token to the first peer to enable the first peer to obtain the item of content from the plurality of second peers.

7. A method as claimed in claim 6, further comprising before receiving a request for the content item from a first peer, distributing the content item unrequested to a group of second peers.

8. A method as claimed in claim 6, further comprising identifying the first peer as a peer from whom at least one part of the item can be downloaded wherein the at least one part of the item is a part already downloaded by the first peer.

* * * * *